(12) United States Patent
Araie et al.

(10) Patent No.: US 11,014,164 B2
(45) Date of Patent: May 25, 2021

(54) LAMINATION MOLDING APPARATUS AND METHOD FOR PRODUCING THREE-DIMENSIONAL MOLDED OBJECT

(71) Applicant: Sodick Co., Ltd., Kanagawa (JP)

(72) Inventors: Ichiro Araie, Kanagawa (JP); Kazufumi Nambu, Kyoto (JP); Atsushi Hirota, Kyoto (JP); Hiroshi Amioka, Kyoto (JP); Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 260 days.

(21) Appl. No.: 16/114,608

(22) Filed: Aug. 28, 2018

(65) Prior Publication Data

US 2019/0061001 A1 Feb. 28, 2019

(30) Foreign Application Priority Data

| Aug. 30, 2017 | (JP) | ............................. JP2017-165090 |
| Feb. 27, 2018 | (JP) | ............................. JP2018-033842 |
| May 31, 2018 | (JP) | ............................. JP2018-104432 |

(51) Int. Cl.
 *B29C 67/00* (2017.01)
 *B22F 12/00* (2021.01)
 (Continued)

(52) U.S. Cl.
 CPC ............ *B22F 12/00* (2021.01); *B22F 3/1007* (2013.01); *B23K 15/0086* (2013.01);
 (Continued)

(58) Field of Classification Search
 CPC ..... B29C 64/153; B29C 64/245; B29C 64/35; B29C 64/371; B29C 64/295; B33Y 10/00; B33Y 30/00; B33Y 40/00
 See application file for complete search history.

(56) References Cited

U.S. PATENT DOCUMENTS

| 5,508,489 A | 4/1996 | Benda et al. |
| 8,999,222 B2 | 4/2015 | Abe et al. |
| | (Continued) | |

FOREIGN PATENT DOCUMENTS

| CN | 102905821 A | 1/2013 |
| CN | 105033255 A | 11/2015 |
| | (Continued) | |

OTHER PUBLICATIONS

Extended European Search Report dated Jan. 23, 2019, in connection with counterpart EP Application No. 18190783.3 (11 pgs.).
(Continued)

*Primary Examiner* — Joseph S Del Sole
*Assistant Examiner* — Thu Khanh T Nguyen
(74) *Attorney, Agent, or Firm* — Maier & Maier, PLLC

(57) ABSTRACT

A lamination molding apparatus, includes a material layer former to form a material layer; a first emitter to form a solidified layer by irradiating the material layer with a first beam; and a thermal adjuster to adjust a temperature of at least a portion of the solidified layer to at least one of a predetermined first temperature and a predetermined second temperature. The temperature of at least the portion of the solidified layer is adjusted to the first temperature, and then to the second temperature. When the first temperature is referred to as T1, the second temperature is referred to as T2, a martensite start temperature of the solidified layer is referred to as Ms, and a martensite finish temperature of the solidified layer is referred to as Mf, all of the following relations of T1≥Mf, T1>T2, and T2≤Ms are satisfied.

10 Claims, 26 Drawing Sheets

(51) Int. Cl.

| | | |
|---|---|---|
| *B22F 3/10* | (2006.01) | |
| *B33Y 30/00* | (2015.01) | |
| *B33Y 10/00* | (2015.01) | |
| *B23K 15/00* | (2006.01) | |
| *B33Y 40/00* | (2020.01) | |
| *B29C 64/153* | (2017.01) | |
| *B29C 64/295* | (2017.01) | |
| *C21D 1/06* | (2006.01) | |
| *B22F 3/24* | (2006.01) | |
| *B29C 35/08* | (2006.01) | |
| *B22F 10/10* | (2021.01) | |

(52) U.S. Cl.
CPC .......... *B29C 64/153* (2017.08); *B29C 64/295* (2017.08); *B33Y 10/00* (2014.12); *B33Y 30/00* (2014.12); *B33Y 40/00* (2014.12); *C21D 1/06* (2013.01); *B22F 3/1028* (2013.01); *B22F 10/10* (2021.01); *B22F 2003/248* (2013.01); *B22F 2201/11* (2013.01); *B22F 2203/03* (2013.01); *B22F 2203/11* (2013.01); *B22F 2998/10* (2013.01); *B22F 2999/00* (2013.01); *B29C 2035/0838* (2013.01); *B29C 2035/0877* (2013.01); *C21D 2211/001* (2013.01); *C21D 2211/008* (2013.01); *C21D 2221/00* (2013.01)

(56) References Cited

U.S. PATENT DOCUMENTS

| | | |
|---|---|---|
| 9,908,319 B2 | 3/2018 | Amaya et al. |
| 2013/0065073 A1 | 3/2013 | Fuwa |
| 2013/0069282 A1 | 3/2013 | Abe et al. |
| 2014/0263209 A1 | 9/2014 | Burris et al. |
| 2014/0265046 A1 | 9/2014 | Burris et al. |
| 2014/0265047 A1 | 9/2014 | Burris et al. |
| 2014/0265048 A1 | 9/2014 | Burris et al. |
| 2014/0265049 A1 | 9/2014 | Burris et al. |
| 2014/0271328 A1 | 9/2014 | Burris et al. |
| 2015/0064048 A1 | 3/2015 | Bessac et al. |
| 2015/0142160 A1 | 5/2015 | Ohnishi |
| 2015/0328836 A1 | 11/2015 | Okazaki |
| 2016/0108483 A1 | 4/2016 | Meyer et al. |
| 2017/0080497 A1* | 3/2017 | Tuffile ................ B33Y 40/00 |
| 2017/0129184 A1* | 5/2017 | Buller ................ B29C 64/268 |
| 2017/0130291 A1 | 5/2017 | Arlazarov |
| 2017/0225228 A1 | 8/2017 | Naghama |
| 2017/0274597 A1 | 9/2017 | Amaya et al. |

FOREIGN PATENT DOCUMENTS

| | | |
|---|---|---|
| CN | 105170977 A | 12/2015 |
| CN | 105188993 A | 12/2015 |
| CN | 106493364 A | 3/2017 |
| JP | 2007-270227 A | 10/2007 |
| JP | 2008-307895 A | 12/2008 |
| JP | 5653657 B2 | 12/2011 |
| JP | 2015-098111 A | 5/2015 |
| JP | 6026688 B1 | 11/2016 |
| JP | 2017-141505 A | 8/2017 |
| KR | 10-2017-0002857 A | 1/2017 |
| KR | 10-2017-0019558 A | 2/2017 |
| WO | 2016/016683 A1 | 2/2016 |

OTHER PUBLICATIONS

Japanese Office Action dated Feb. 19, 2019, in connection with corresponding JP Application No. 2018-033842 (8 pgs., including machine-generated English translation).

Taiwanese Office Action dated Feb. 14, 2019, in connection with corresponding TW Application No. 107129330 (28 pgs., including machine-generated English translation).

Korean Office Action dated Jan. 11, 2020, in connection with corresponding KR Application No. 10-2018-0095892 (13 pgs., including machine-generated English translation).

Taiwanese Office Action dated Sep. 22, 2020, in connection with corresponding TW Application No. 107129330 (17 pp., including machine-generated English translation).

Chinese Office Action dated Aug. 27, 2020, in connection with corresponding CN Application No. 201810996865.6 (13 pgs., including machine-generated English translation).

* cited by examiner

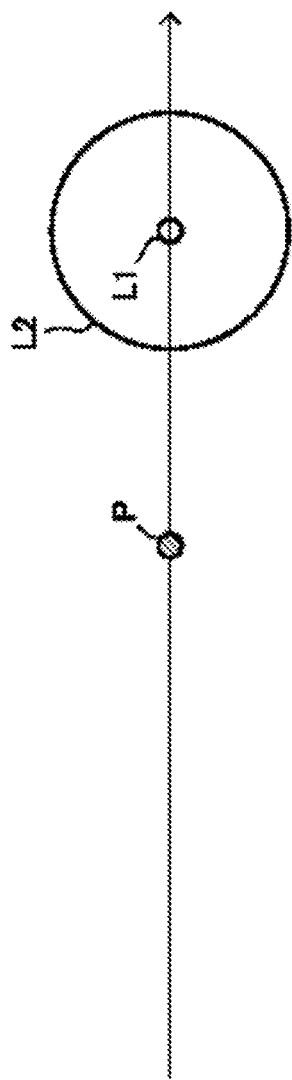

LAMINATION MOLDING APPARATUS AND METHOD FOR PRODUCING THREE-DIMENSIONAL MOLDED OBJECT

Priority is claimed on Japanese application No. 2017-165090, filed Aug. 30, 2017, on Japanese application No. 2018-033842, filed Feb. 27, 2018, and on Japanese application No. 2018-104432, filed May 31, 2018, the content of which are incorporated herein by reference.

FIELD

The present invention relates to a lamination molding apparatus and to a method for manufacturing lamination molded product.

BACKGROUND

There are several methods for conducting lamination molding of metal. Known methods are Selective Laser Sintering (SLS), Selective Laser Melting (SLM), Electron Beam Sintering (EBS), Electron Beam Melting (EBM), Laminated Object Manufacturing (LOM), and the like. According to such methods, a material layer made of a metal material is formed, and then a predetermined portion of the material layer is irradiated with a beam such as laser beam or electron beam to sinter or melt the material layer at the irradiated position. These processes are repeated to laminate a plurality of sintered layers or melted layers, thereby forming a desired three-dimensional molded product. Here, the first material layer can be formed on a molding plate placed in a chamber. Hereinafter, "sinter" and "melt" are collectively referred to as "solidify", and "sintered layer" and "melted layer" are collectively referred to as "solidified layer".

[Patent Literature 1] U.S. Pat. No. 8,999,222B2
[Patent Literature 2] US2015/0142160A1
[Patent Literature 3] U.S. Pat. No. 9,908,319B2

SUMMARY

In lamination molding of metal, the solidified layer has a very high temperature immediately after being solidified. The temperature of the solidified layer drops sharply due to heat radiation to other solidified layer already formed, to the molding plate, and to the atmosphere. During such temperature drop, the volume of the solidified layer shrinks since the thermal expansion coefficient of metal is normally positive. However, since the solidified layer is adhered to the adjacent solidified layer or the molding plate, the amount of such shrinkage is restricted, and thus a tensile stress remains in the solidified layer.

On the other hand, when the metal material is a martensitic material such as carbon steel, martensitic stainless steel, the solidified layer immediately after formation is in an austenite phase, and at least a part of the austenite phase is transformed into a martensite phase by cooling within predetermined temperature conditions. Since martensitic transformation involves volumetric expansion, a compressive stress is generated.

Accordingly, the martensitic transformation can be intentionally made to take place with the solidified layer, thereby reducing the tensile stress of metal by shrinkage with the compressive stress by the martensitic transformation. Accordingly, the residual stress of the molded product can be controlled.

According to the present invention, provided is a lamination molding apparatus, comprising: a material layer former to form a material layer in a molding region, the material layer being formed for each of a plurality of divisional layers which are a desired three-dimensional molded product divided by a predetermined height; a first emitter to form a solidified layer by irradiating a predetermined irradiation region of the material layer in the predetermined divisional layer with a first beam to sinter or melt the material layer; and a thermal adjuster to adjust a temperature of at least a portion of the solidified layer to at least one of a predetermined first temperature and a predetermined second temperature; wherein: the temperature of the at least a portion of the solidified layer is adjusted to the first temperature, and then to the second temperature; and when the first temperature is referred to as T1, the second temperature is referred to as T2, a martensite start temperature of the solidified layer is referred to as Ms, and a martensite finish temperature of the solidified layer is referred to as Mf, following formulas of (1) to (3) are all satisfied.

$$T1 \geq Mf \quad (1)$$

$$T1 > T2 \quad (2)$$

$$T2 \leq Ms \quad (3)$$

Further, according to the present invention, provided is a method for manufacturing a lamination molded product, comprising the steps of: a material layer forming step to form a material layer in a molding region, the material layer being formed for each of a plurality of divisional layers which are a desired three-dimensional molded product divided by a predetermined height; a solidifying step to form a solidified layer by irradiating a predetermined irradiation region in the material layer of the divisional layer with a first beam and sintering or melting the predetermined irradiation region; an initial thermal adjustment step to adjust the temperature of at least a portion of the solidified layer to a predetermined first temperature; and a next thermal adjustment step to adjust the temperature of the at least a portion of the solidified layer having the first temperature to a predetermined second temperature; wherein when the first temperature is referred to as T1, the second temperature is referred to as T2, a martensite start temperature of the solidified layer is referred to as Ms, and a martensite finish temperature of the solidified layer is referred to as Mf, following formulas of (1) to (3) are all satisfied.

$$T1 \geq Mf \quad (1)$$

$$T1 > T2 \quad (2)$$

$$T2 \leq Ms \quad (3)$$

The lamination molding apparatus according to the present invention intentionally allows martensitic transformation to occur while performing lamination molding. Accordingly, tensile stress generated with the molded product is suppressed, thereby decreasing the deformation of the molded product.

BRIEF DESCRIPTION

The above further objects, features and advantages of the present invention will become more apparent from the following detailed description taken in conjunction with the accompanying drawings, wherein:

FIG. 12E is an explanatory drawing showing the predetermined portion after the initial thermal adjustment step in the lamination molding apparatus according to the second embodiment.

DETAILED DESCRIPTION

First Embodiment

Figure 1:
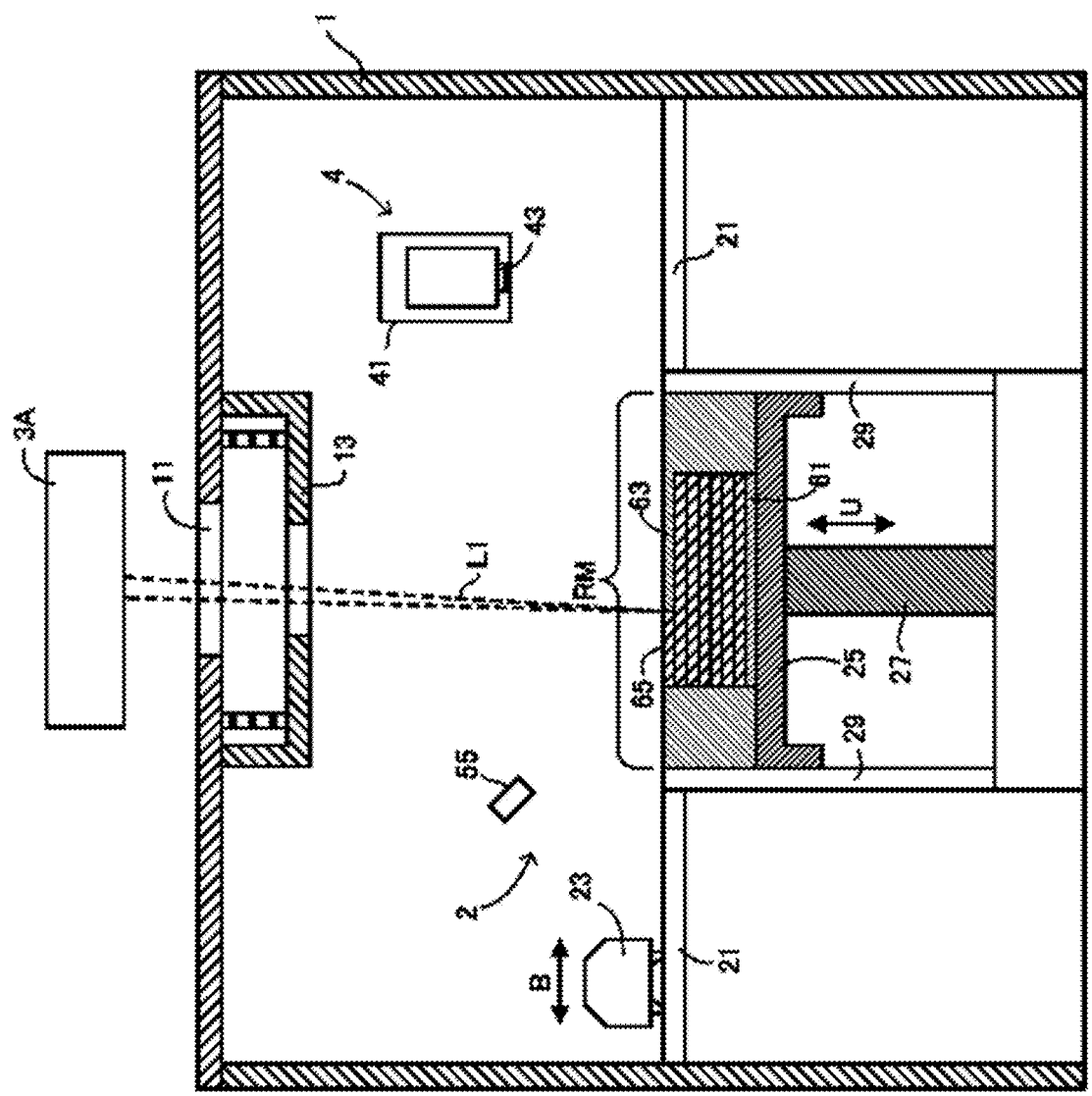
FIG. 1 is a rough structural diagram of a lamination molding apparatus according to the first embodiment.

Hereinafter, the first embodiment of the present invention will be described by referring to the drawings. Here, the characteristic matters shown in the embodiments can be combined with each other.

Regarding the lamination molding apparatus according to the first embodiment of the present invention, a material layer 63 made of material powder is formed, and then a predetermined portion of the material layer 63 is irradiated with a first beam L1 to sinter or melt the material powder at the irradiated position. These processes are repeated to laminate a plurality of solidified layers 65 to mold a three-dimensional molded product. As shown in FIG. 1, the lamination molding apparatus of the present invention comprises a chamber 1, a material layer former 2, an irradiation unit 3A, and a cutting device 4.

A clean inert gas is supplied into the chamber 1 covering the predetermined molding region RM, and an inert gas containing fume generated during sintering or melting the material layer 63 is discharged from the chamber 1. Accordingly, the chamber 1 is filled with an inert gas having a predetermined concentration. Inert gas refers to a gas which substantially does not react with the material used, and is nitrogen or argon for example.

As shown in FIG. 1, the material layer former 2 to form a material layer 63 in the molding region RM is provided in the chamber 1. Here, the material layer 63 is formed for each of a plurality of divisional layers of a desired three-dimensional molded product divided by a predetermined height. The material layer former 2 comprises a base 21 including the molding region RM, and a recoater head 23 arranged on the base 21, the recoater head 23 reciprocating in a horizontal direction which is shown by arrow B. Blades are provided on both sides of the recoater head 23, respectively. The recoater head 23 reciprocates while discharging the material powder contained in the recoater head 23 from a bottom surface of the recoater head 23. The blades planarize the discharged material powder to form the material layer 63. In the molding region RM, a molding table 25 which moves vertically, namely moves in a direction shown by arrow U, by the molding table driving mechanism 27 is provided. When the lamination molding apparatus is used, the molding plate 61 is usually arranged on the molding table 25, and the first layer of the material layer 63a is formed on the molding plate 61. Around the molding table 25, a powder retaining wall 29 is provided. In a powder retaining space which is surrounded by the powder retaining wall 29 and the molding table 25, unsolidified material powder is retained. Here, the molding region RM is a region capable of forming the lamination molded product, and the material layer 63 is formed in the molding region RM. Further, an irradiation region RI is a region in the molding region RM in which a solidified layer 65 is formed, and roughly matches with a region surrounded by the contour shape of the desired three-dimensional molded product.

The irradiation unit 3A is provided above the chamber 1. The irradiation unit 3A according to the first embodiment comprises a first emitter 31 to form the solidified layer by irradiating a predetermined irradiation region RI of the material layer 63 with the first beam L1 and sintering or melting the predetermined irradiation region RI, and a scanner 34 to scan the first beam L1.

Figure 2:
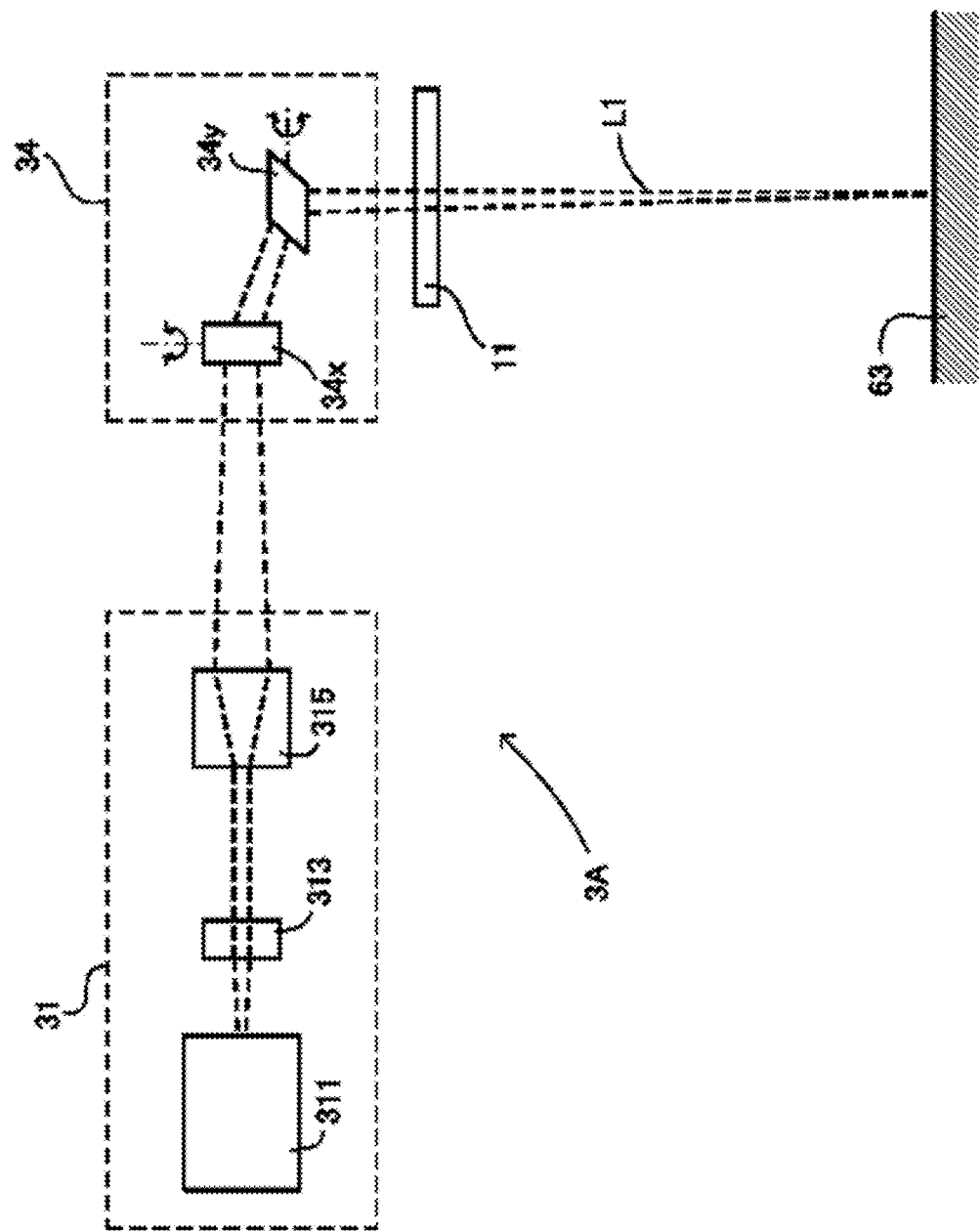
FIG. 2 is a rough structural diagram of an irradiation unit according to the first embodiment.

As shown in FIG. 2, the first emitter 31 comprises a first light source 311, a first collimator 313, and a first focus controller 315. The first light source 311 emits the first beam L1. Here, the first beam L1 is a laser beam which can sinter or melt the material layer 63, and is a $CO_2$ laser, fiber laser, or a YAG laser, for example. The first collimator 313 converts the first beam L1 emitted from the first light source 311 into a parallel light. The first focus controller 315 focuses the first beam L1 emitted from the first light source 311 and adjusts the diameter of the first beam L1 to a desired spot diameter.

The scanner 34 is a two-axis galvanometer scanner for example. The galvanometer scanner is provided with a pair of galvanometer mirrors 34x and 34y, and two actuators to rotate the galvanometer mirrors 34x and 34y, respectively. The two-axis galvanometer scanner 34 performs two-dimensional scanning by controlling the first beam L1 emitted from the first light source 311. A control device (not shown) supplies control signals to the two actuators to control rotation angles around two axes of the galvanometer mirrors 34x and 34y. Accordingly, the first beam L1 can be emitted to a desired position by altering the control signals being input to the two actuators.

The first beam L1 which passed through the galvanometer mirrors 34x and 34y further passes through a protection window 11 provided at the upper portion of the chamber 1. Accordingly, the material layer 63 formed in the molding region RM is irradiated with the first beam L1. Here, a contamination prevention device 13 is provided so as to cover the protection window 11. The contamination prevention device 13 is structured so as to fill the supplied inert gas under the protection window 11, and to discharge the inert gas towards below. Accordingly, fume is removed from the pathway of the first beam L1, and the protection window 11 is prevented from being contaminated by the fume.

The cutting device 4 has a machining head 41 provided with a spindle head 43. The spindle head 43 can be rotated with a cutting tool such as an end mill attached to the spindle head 43. The machining head 41 moves the spindle head 43 to a desired position within the chamber 1 by a machining head driving mechanism (not shown). Such cutting device 4 can perform cutting to the surface or unnecessary portions of the solidified layer 65.

Here, the lamination molding apparatus according to the first embodiment comprises a thermal adjuster which adjusts the temperature of at least a portion of the solidified layer to at least one of a predetermined first temperature T1 and a predetermined second temperature T2. Hereinafter, the solidified layer subjected to thermal adjustment, that is, the solidified layer in which the thermal adjustment performed in the order of the first temperature T1 and the second temperature T2 has never been completed is referred to as an upper surface layer. Here, the thermal adjustment is not limited to an active temperature operation performed by the thermal adjuster. For example, depending on the composition of the material, the surrounding temperature can be an appropriate temperature as the first temperature T1 or the second temperature T2. In such case, the thermal adjuster can adjust the temperature only to either one of the first temperature T1 or the second temperature T2. The thermal adjuster according to the first embodiment adjusts the temperature of at least a portion of the upper surface layer in the order of the first temperature T1 and the second temperature T2. Preferably, the thermal adjuster according to the first embodiment adjusts the temperature of at least a portion of the upper surface layer in the order of the first temperature T1, the second temperature T2, and the first temperature T1. Here, regarding the first temperature T1, the second temperature T2, the martensite start temperature Ms of the solidified layer 65, and the martensite finish temperature Mf of the solidified layer 65, the following formulas of (1) to (3) are all satisfied.

$$T1 \geq Mf \tag{1}$$

$$T1 > T2 \tag{2}$$

$$T2 \leq Ms \tag{3}$$

After sintering or melting, the upper surface layer before being subjected to the thermal adjustment is in a condition containing the austenite phase. At least a portion of the austenite phase is transformed into the martensite phase by the thermal adjustment.

The thermal adjuster need only be structured so as to be capable of carrying out the thermal adjustment of the temperature of the upper surface layer to at least one of the first temperature T1 and the second temperature T2. Specifically, the thermal adjuster comprises at least one of a heater to adjust the temperature of the upper surface layer to the first temperature T1 and a cooler to cool the temperature of the upper surface layer to the second temperature T2. Preferably, the thermal adjuster comprises both of the heater and the cooler. Hereinafter, as a specific example of the thermal adjuster, a first thermal adjuster 51 and a second thermal adjuster 52 are shown.

Figure 3:
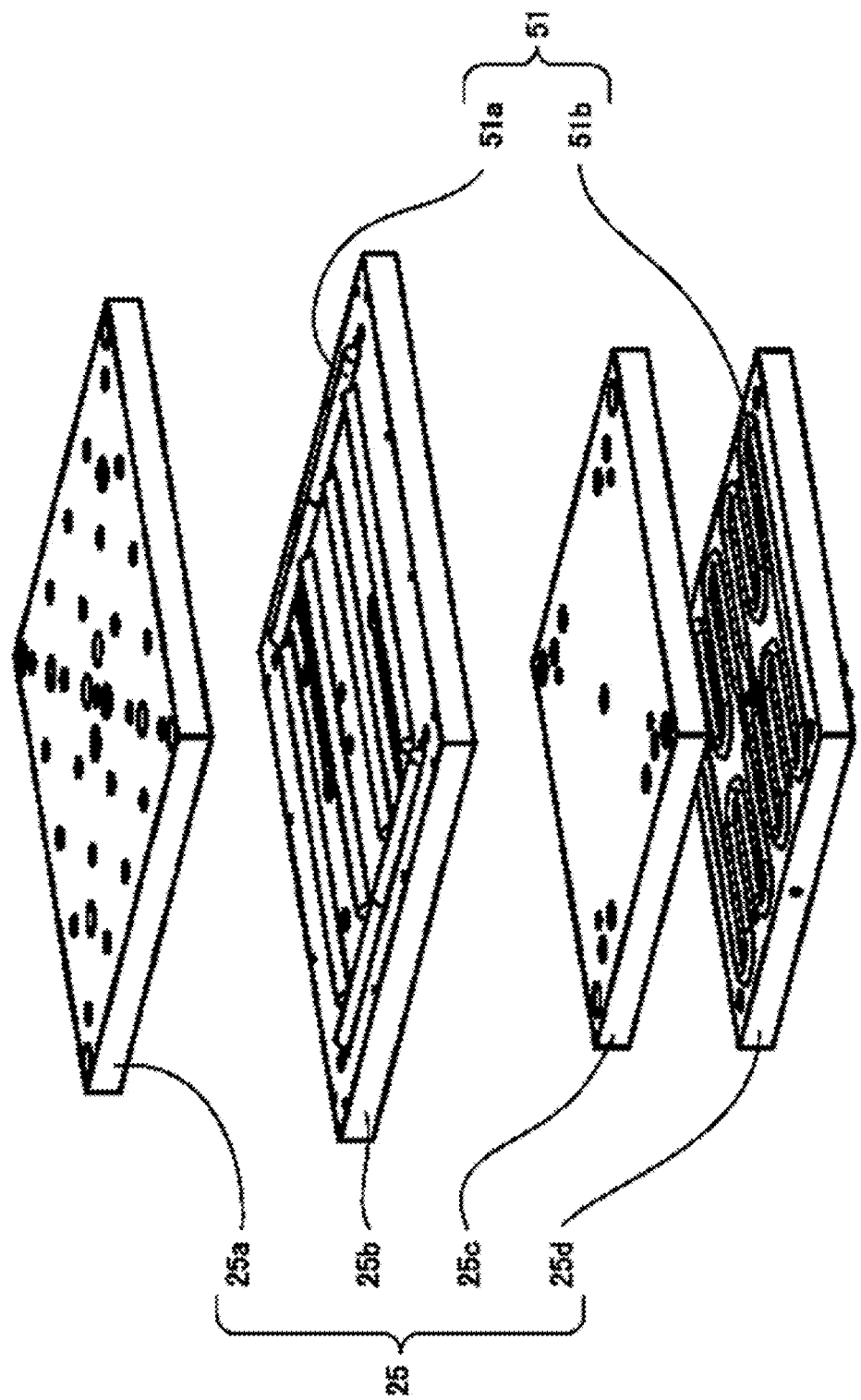
FIG. 3 is a rough structural diagram of a first thermal adjuster.

The first thermal adjuster 51 comprises a heater 51a and a cooler 51b arranged inside the molding table 52. The heater 51a is, for example, an electric heater or a pipeline in which a heating medium flows. The cooler 51b is, for example, a pipeline in which a heating medium flows. As the heating medium, various fluids such as water, oil, liquid nitrogen can be used. As shown in FIG. 3, in a specific configuration example, the molding table 25 comprises a top plate 25a and three supporting plates 25b, 25c, and 25d. Between the top plate 25a and the supporting plate 25b, the heater 51a is provided. Between the supporting plate 25c and the supporting plate 25d, the cooler 51b is provided. The temperature of the molding table 25 can be controlled to a desired temperature including the first temperature T1 and the second temperature T2 by the heater 51a and the cooler 51b. Here, in order to prevent thermal displacement of the molding table driving mechanism 27, a constant temperature section of which temperature is maintained constant can be provided between the first thermal adjuster 51 and the molding table driving mechanism 27. By structuring the first thermal adjuster 51 as described above, the temperature of the upper surface layer can be adjusted to the desired temperature by the molding plate 61 which is in contact with the top plate 51c of the molding table 25 having a temperature controlled at the desired temperature, and by the solidified layer 65 positioned lower than the upper surface layer.

Here, it is preferable that the material layer 63 is preheated to a predetermined temperature before sintering or melting, and the first thermal adjuster 51 can serve also as the preheating device of the material layer 63. For example, when the first temperature T1 is appropriate as the preheating temperature, preferably, the temperature of the material layer 63 is preheated to the first temperature T1 by the first thermal adjuster 51.

Figure 4:
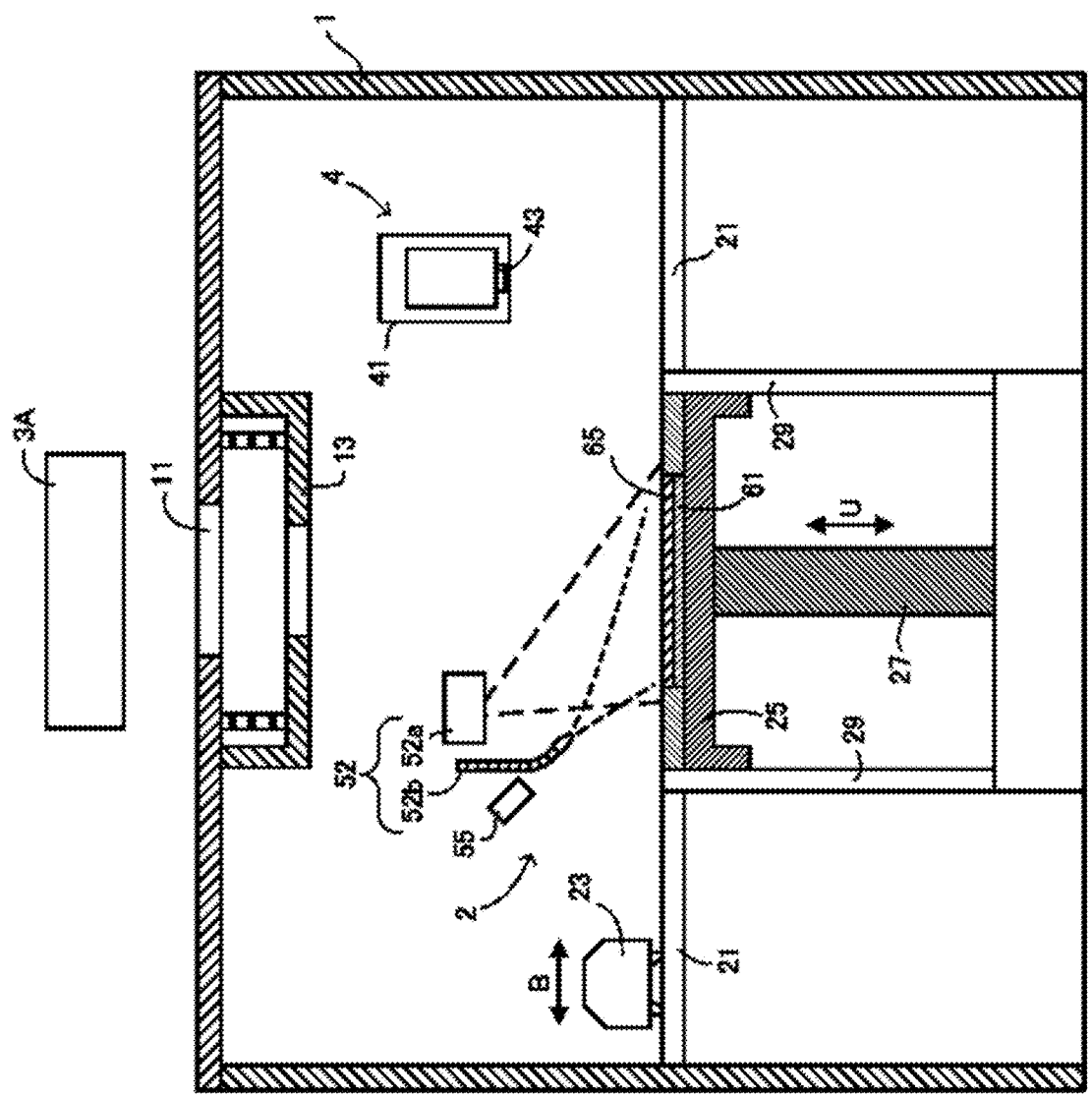
FIG. 4 is a rough structural diagram of a second thermal adjuster.

The second thermal adjuster 52 shown in FIG. 4 comprises a heater 52a to adjust the temperature of the upper surface layer from its upper side to the first temperature T1, and a cooler 52b to adjust the temperature of the upper surface layer from its upper side to the second temperature T2. The heater 52a is, for example, a heating light source such as a halogen lamp. The cooler 52b is, for example, an air blower which blows a cooled gas such as the same kind of the inert gas filling the chamber onto the upper surface layer, or a cooling structure which allows a cooled plate cooled by a Peltier element and the like to come in contact with the upper surface layer. With such second thermal adjuster 52, the temperature of the upper surface layer can be directly adjusted, and thus thermal adjustment of the upper surface layer can be performed swiftly even after a plurality of solidified layers 65 are formed.

As described, the thermal adjuster need only be structured so as to be capable of carrying out the thermal adjustment of the temperature of the upper surface layer to at least one of the first temperature T1 and the second temperature T2, and can adopt various configurations. For example, as the thermal adjuster, one of or both of the first thermal adjuster 51 and the second thermal adjuster 52 can be provided. For example, the thermal adjuster can have any combination of the heater 51a and the cooler 51b of the first thermal adjuster 51, and the heater 52a and the cooler 52b of the second thermal adjuster 52. The thermal adjuster can have other configuration.

Further, as shown in FIG. 1, the lamination molding apparatus can have a temperature sensor 55 to measure the temperature of the upper surface layer, and the thermal adjuster can be feedback-controlled in accordance with a temperature measured by the temperature sensor 55. With such configuration, temperature of the upper surface layer can be controlled with higher accuracy. One or a plurality of temperature sensors 55 can be provided. In addition, the temperature sensor 55 is, for example, an infrared temperature sensor.

Figure 5:
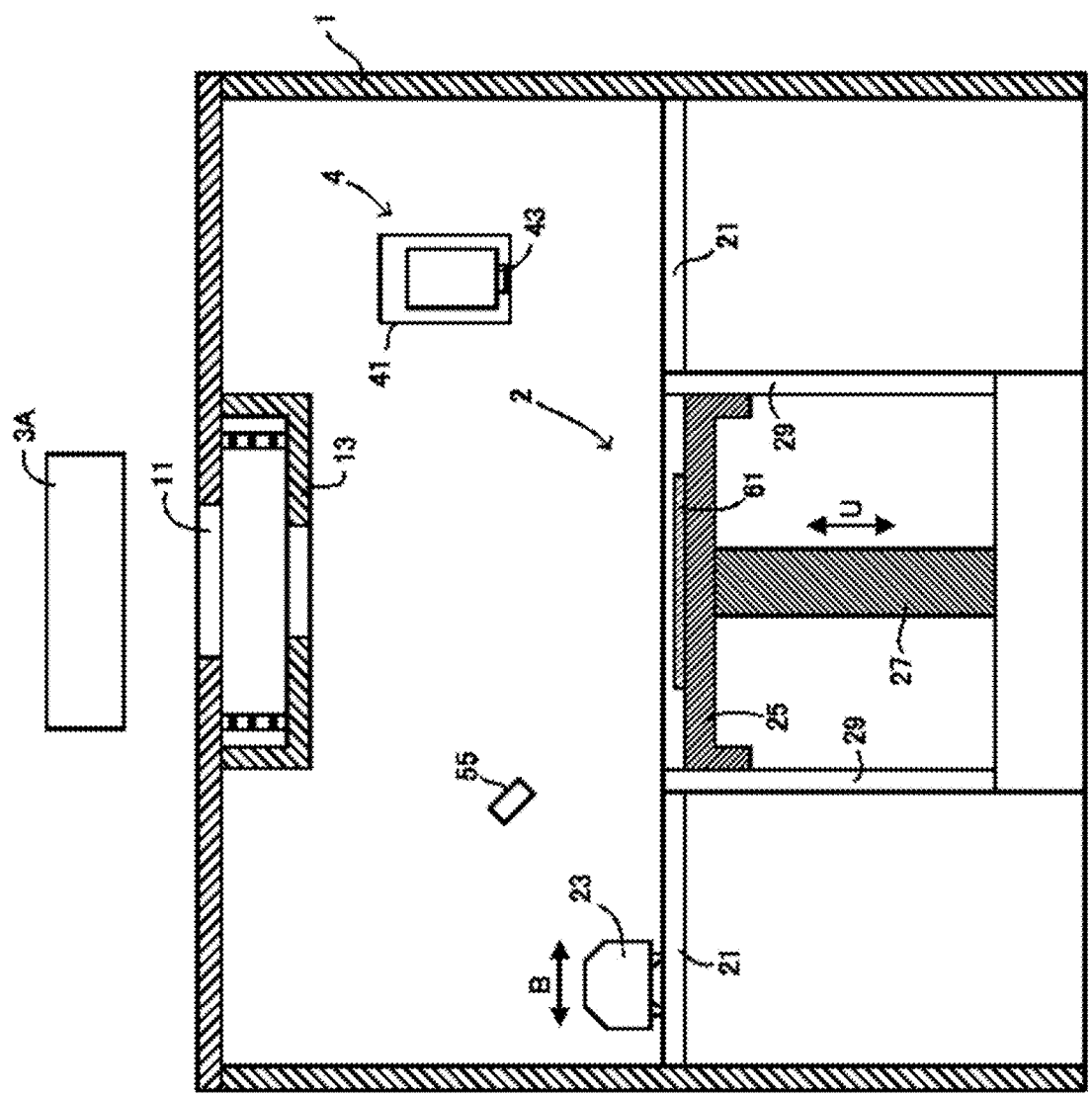
FIG. 5 is an explanatory drawing of a lamination molding method using a lamination molding apparatus according to the first embodiment.
Figure 6:
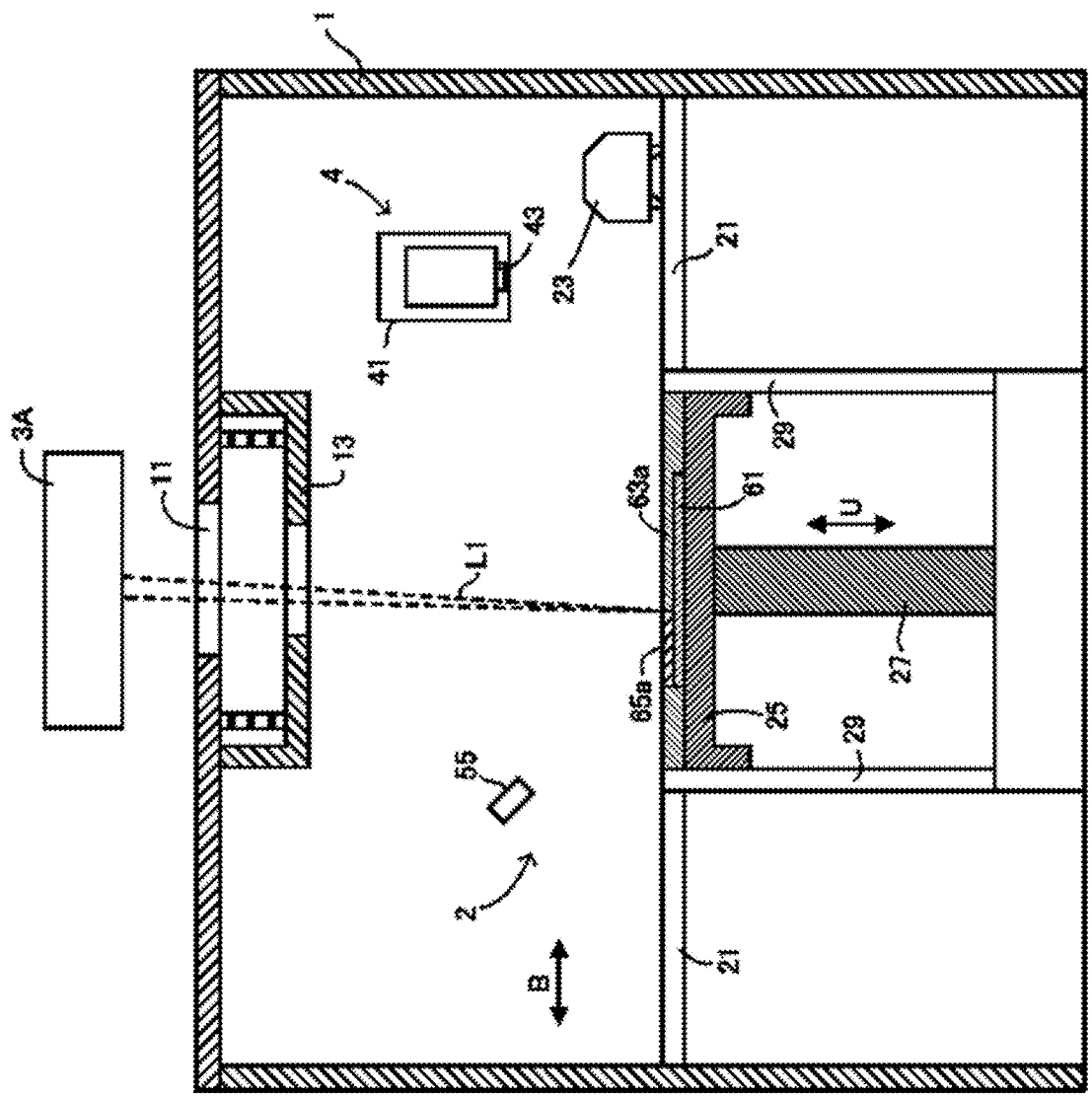
FIG. 6 is an explanatory drawing of a lamination molding method using a lamination molding apparatus according to the first embodiment.
Figure 7:
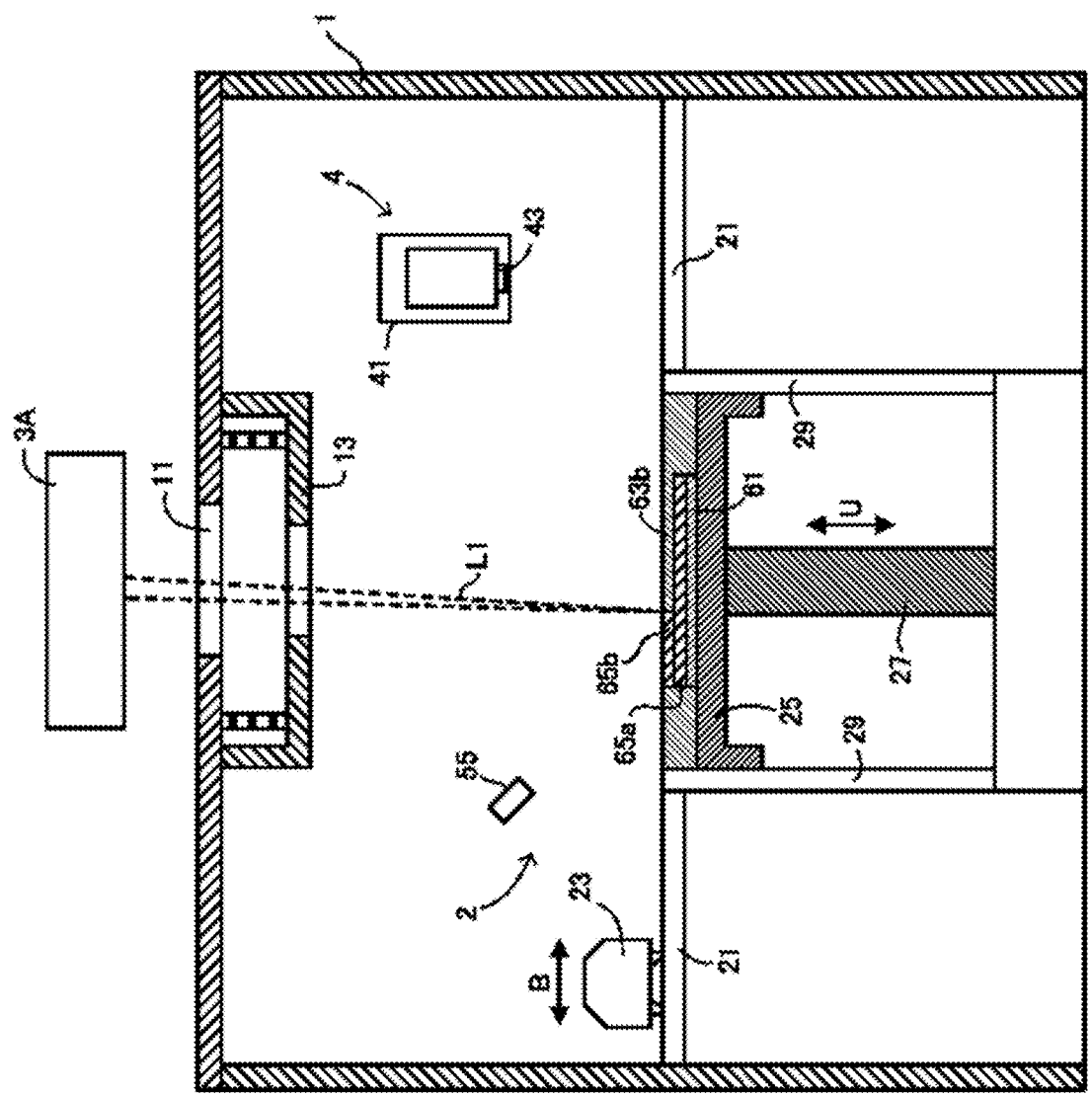
FIG. 7 is an explanatory drawing of a lamination molding method using a lamination molding apparatus according to the first embodiment.

Here, each of the steps of the manufacturing method of the lamination molded product according to the first embodiment will be described with reference to FIG. 5 to FIG. 7. Hereinafter, a step to form the material layer 63 in the molding region RM, the material layer 63 being formed for the plurality of divisional layers which are the desired three-dimensional molded product divided by a predetermined height, is referred to as a material layer forming step. A step to form the solidified layer 65 by irradiating the predetermined irradiation region RI of the material layer 63 with the first beam L1 and sintering or melting the predetermined irradiation region RI is referred to as a solidifying step. A step to adjust the temperature of at least a portion of the upper surface layer to the predetermined first temperature T1 is referred to as an initial thermal adjustment step. A step to adjust the temperature of the at least a portion of the upper surface layer at the first temperature T1 to the predetermined second temperature T2 is referred to as a next thermal adjustment step. Here, as described, the thermal adjustment performed in the initial thermal adjustment step and the next thermal adjustment step are not limited to an active temperature operation performed by the thermal adjuster.

As described, it is preferable to have the material layer 63 preheated to the predetermined temperature upon solidification. Hereinafter, a step to preheat the material layer 63 before being irradiated with the first beam L1 is referred to as a preheating step. The temperature to which the material layer 63 is to be preheated is appropriately selected depending on the material. Here, when the first temperature T1 is appropriate as the preheating temperature, the preheating temperature can be the first temperature T1. In such case, since the temperature of the material layer 63 is set to the first temperature T1 beforehand in the preheating step, the time required to raise the temperature to the first temperature T1 in the initial thermal adjustment step can be shortened.

As a start, the first material layer forming step is carried out. As shown in FIG. 5, the molding plate 61 is placed on the molding table 25, and the height of the molding table 25 is adjusted to an appropriate position. In this condition, the recoater head 23 filled with the material powder is moved in the direction shown by arrow B, thereby forming the first layer of the material layer 63a on the molding plate 61. Here, the first preheating step is carried out after or simultaneously with the first material layer forming step. For example, the temperature of the molding table 25 is adjusted to the predetermined preheating temperature, the first temperature T1 in this case, by the first thermal adjuster 51. Accordingly, preheating of the first layer of the material layer 63a is carried out.

Subsequently, the first solidifying step is carried out. A predetermined portion in the first layer of the material layer 63a is irradiated with the first beam L1 to sinter or melt the portion irradiated with the first beam L1, to obtain the first layer of the solidified layer 65a as shown in FIG. 6.

Subsequently, the second material layer forming step is carried out. The height of the molding table 25 is descended by a predetermined thickness of the material layer 63, and then the recoater head 23 is moved in the direction shown by arrow B, to form a second layer of the material layer 63b on the first layer of the solidified layer 65a. In addition, the preheating step is carried out to preheat the second layer of the material layer 63b.

Subsequently, the second solidifying step is carried out. A predetermined portion in the second layer of the material layer 63b is irradiated with the first beam L1 to sinter or melt the portion irradiated with the first beam L1, to obtain the second layer of the solidified layer 65b as shown in FIG. 7.

The steps described above are repeated to form the third and subsequent layers of the solidified layers 65.

The initial thermal adjustment step is preferably carried out simultaneously with the afore-mentioned steps. In the first embodiment, the preheating temperature is the first temperature T1, and thus the solidified layer 65 formed by the solidifying step, that is the upper surface layer, is subjected to thermal adjustment to the first temperature T1 by the thermal adjuster, and is kept at the first temperature T1. In other words, the preheating step to the material layer 63 serves also as the initial thermal adjustment step to the upper surface layer.

At the timing where a predetermined number of the solidified layers 65 are formed, the next thermal adjustment step is carried out. The thermal adjuster adjusts the temperature of the upper surface layer retained at the first temperature T1 to the second temperature T2. After the next thermal adjustment step, the thermal adjuster adjusts the temperature of the upper surface layer to a preheating temperature, in this case, to the first temperature T1 in preparation for the next preheating step.

Here, in the lamination molding apparatus provided with the cutting device 4 as in the first embodiment, every time after a predetermined number of solidified layers 65 are formed, a cutting step can be carried out to perform cutting to the end face of the solidified layers 65 by a cutting tool mounted to the spindle head 43. Preferably, the cutting is performed to the upper surface layer after being subjected to the next thermal adjustment step. Accordingly, since the cutting is performed to the upper surface layer which went through the martensitic transformation and has a stable dimension, cutting can be performed with higher accuracy. More preferably, cutting is performed to the upper surface layer after being subjected to the next thermal adjustment step and thermal adjustment to normal temperature. By such, cutting can be performed to the upper surface layer while suppressing the effect of the expansion or shrinkage caused by temperature. Accordingly, cutting can be performed with higher accuracy. The normal temperature is defined as a temperature from about 5° C. to about 35° C. In addition, there are cases where a sputter generated during sintering or melting adheres onto the surface of the solidified layer 65 to form a protrusion. When the recoater head 23 collides with the protrusion during the material layer forming step, the upper face of the uppermost solidified layer 65 can be subjected to cutting.

The material layer forming step, the preheating step, the solidifying step, the initial thermal adjustment step, the next thermal adjustment step, and the cutting step as such are repeated as necessary, thereby forming the desired three-dimensional molded product. Here, the initial thermal adjustment step and the next thermal adjustment step can be carried out each time when one layer of the solidified layer 65 is formed, each time after a plurality of the solidified layers 65 are formed, or can be carried out immediately before the cutting step is carried out. As described, the initial thermal adjustment step can be carried out simultaneously with other steps. In addition, the cycle for carrying out the initial thermal adjustment step and the next thermal adjustment step can be set variably depending on the shape of the molded product for example.

Figure 8:
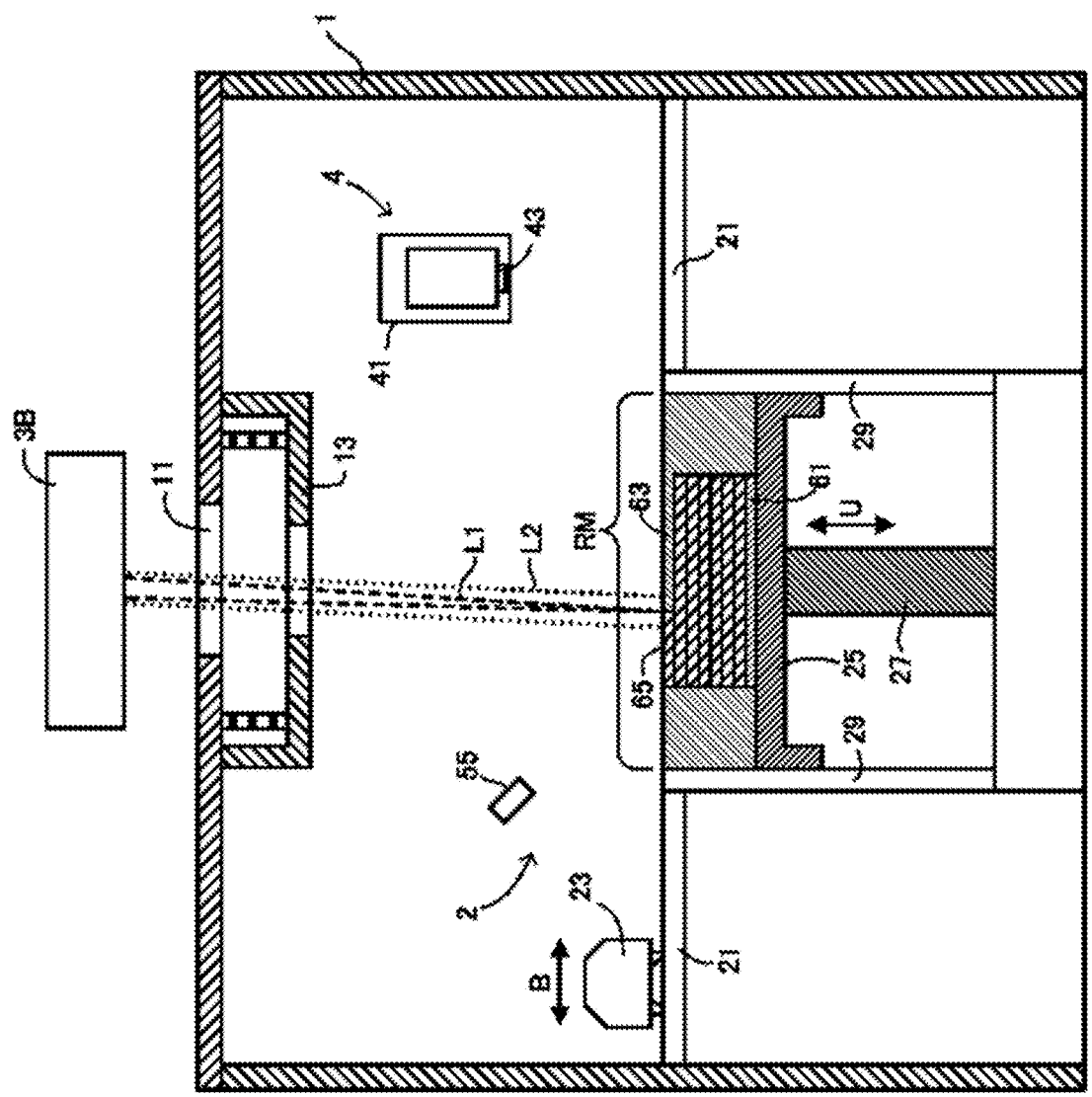
FIG. 8 is a rough structural diagram of a lamination molding apparatus according to the second embodiment.

Next, the second embodiment according to the present invention will be described with reference to the drawings. Here, the characteristic matters shown in the embodiments can be combined with each other. As shown in FIG. 8, the constituent elements that are substantially the same as the constituent elements of the first embodiment are provided with the same reference numbers, and detailed explanations of the constituent elements are omitted. Specifically, the chamber 1, the material layer former 2, and the cutting device 4 are substantially the same as the constituent elements of the first embodiment.

Figure 9:
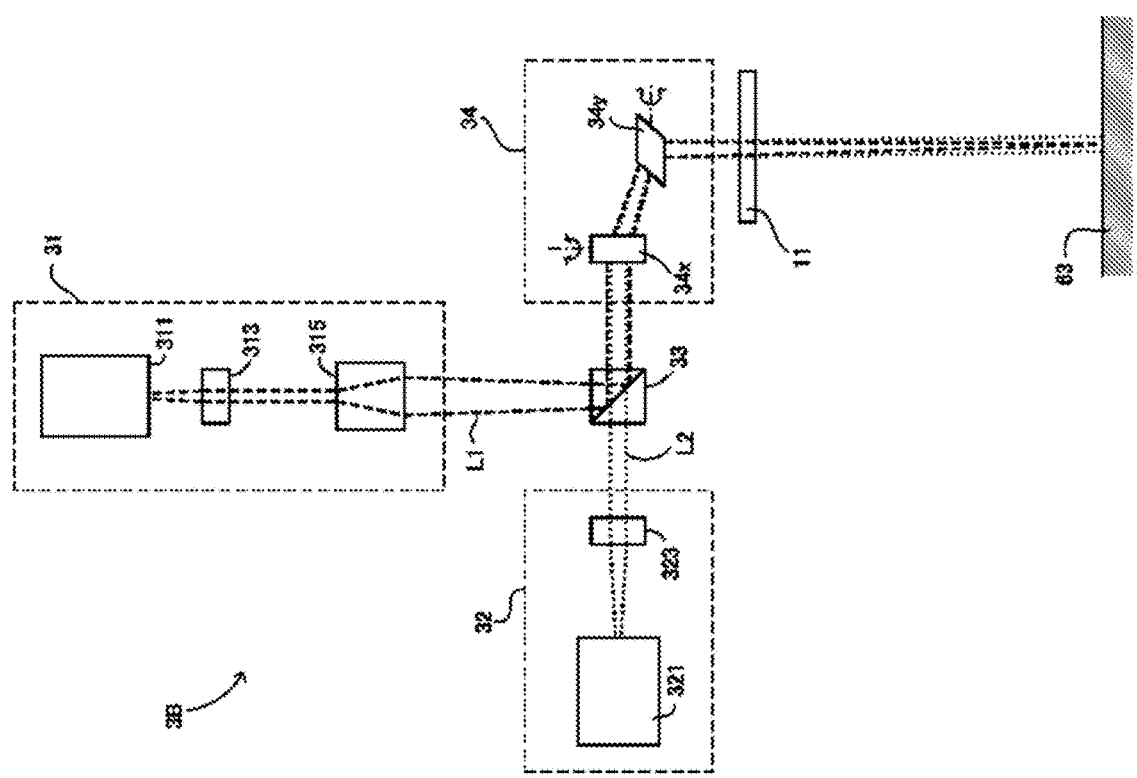
FIG. 9 is a rough structural diagram of an irradiation unit according to the second embodiment.

An irradiation unit 3B is provided above the chamber 1. As shown in FIG. 9, the irradiation unit 3B according to the second embodiment comprises a first emitter 31 to form the solidified layer 65 by irradiating the predetermined irradiation region RI of the material layer 63 with the first beam L1 and sintering or melting the predetermined irradiation region RI, a second emitter 32 to adjust the temperature of the solidified layer 65 to the predetermined first temperature T1 by irradiating the solidified layer 65 formed by the first beam L1 with a second beam L2, a polarizer 33, and a scanner 34 to scan the first beam L1 and the second beam L2. The first emitter 31 comprises a first light source 311, a first collimator 313, and a first focus controller 315. In addition, the second emitter 32 comprises a second light source 321, and a second collimator 323. Here, other components can be provided as necessary, for example, the second emitter 32 can further comprise a second focus controller to adjust the diameter of the second beam L2 emitted from the second light source 321 to a desired spot diameter.

The first light source 311 emits the first beam L1. Here, the first beam L1 is a laser beam which can sinter or melt the material layer 63, and is a $CO_2$ laser, a fiber laser, or a YAG laser, for example. The first collimator 313 converts the first beam L1 emitted from the first light source 311 into a parallel light. The first focus controller 315 focuses the first beam L1 emitted from the first light source 311 and adjusts the diameter of the first beam L1 to a desired spot diameter. Then, the first beam L1 reaches the polarizer 33, and the polarized first beam L1 progresses to the galvanometer mirrors 34x and 34y of the scanner 34. In this case, the polarized first beam L1 is a reflected light.

The second light source 321 emits the second beam L2. Here, the second beam L2 is a laser beam which can adjust the temperature of the solidified layer 65, especially the temperature of the upper surface layer to the first temperature T1, and is a $CO_2$ laser, a fiber laser, or a YAG laser, for example. The second collimator 323 converts the second beam L2 emitted from the second light source 321 into a parallel light. The second beam L2 reaches to transmit through the polarizer 33, and the transmitted beam of the second beam L2 progress to the galvanometer mirrors 34x and 34y of the scanner 34.

With the structure described above, the second beam L2 adjusts the temperature of the upper surface layer to the first temperature T1. In other words, the third thermal adjuster according to the second embodiment comprises the second emitter 32 which adjusts the temperature of the upper surface layer to the first temperature T1 by irradiating with the second beam L2, the upper surface layer formed by the first beam L1. Preferably, a fourth thermal adjuster to adjust the temperature of the upper surface layer to the second temperature T2 is provided. The fourth thermal adjuster comprises, for example, a cooler which is provided in the molding table 25 and adjusts the temperature of the upper surface layer to the second temperature T2. The cooler is, for example, a pipeline in which a heating medium flows.

In addition, in the second embodiment, the second beam L2 is used also to preheat the material layer 63 before being irradiated with the first beam L1. When the second beam L2 is used for preheating, other measure to preheat the material layer 63 is not always necessary. For example, the heater for preheating in the molding table 25 need not be provided.

Preferably, the irradiation spot of the second beam L2 is larger than the irradiation spot of the first beam L1, and the irradiation spot of the second beam L2 encloses the irradiation spot of the first beam L1. Here, the irradiation spot means a shape of the irradiation position of the first beam L1 and the second beam L2, that is, a shape of the first beam L1 and the second beam L2 at the material layer 63 or the solidified layer 65. When the irradiation spot of the first beam L1 and the second beam L2 are roughly circular, and the diameter of the irradiation spot at the irradiation position of the first beam L1 and the diameter of the irradiation spot of the second beam L2 are defined as d1 and d2, respectively, d2/d1 satisfies, for example, $10 \leq d2/d1 \leq 1000$. With such second beam L2, preheating of the material layer 63 before being irradiated with the first beam L1, and adjustment of the temperature of the upper surface layer to the first temperature T1, the upper surface layer being the solidified layer 65 solidified by irradiation with the first beam L1, can be suitably carried out.

The polarizer 33 allows either one of the first beam L1 or the second beam L2 to transmit through, and polarizes the other to the same optical path as the one which transmitted. The polarizer 33 is, for example, a filter such as a beam splitter. As described, in the second embodiment, the first beam L1 polarized by the polarizer 33 and the second beam L2 which transmitted through the polarizer 33 have the same optical axis and progress to the galvanometer mirrors 34x and 34y. With such constitution, one scanner 34 can allow scanning of the first beam L1 and the second beam L2 with their central position being roughly matched.

Here, as described, the first emitter 31 and the second emitter 32 were arranged so that the first beam L1 polarized by the polarizer 33 and the second beam L2 which transmitted through the polarizer 33 have the same optical axis and progress to the galvanometer mirrors 34*x* and 34*y*. However, the first emitter 31 and the second emitter 32 can be replaced with each other so that the first beam L1 which transmitted through the polarizer 33 and the second beam L2 polarized by the polarizer 33 have the same optical axis and progress to the galvanometer mirrors 34*x* and 34*y*.

The scanner 34 is a two-axis galvanometer scanner for example. The galvanometer scanner is provided with a pair of galvanometer mirrors 34*x* and 34*y*, and actuators to rotate the galvanometer mirrors 34*x* and 34*y*, respectively. The two-axis galvanometer scanner 34 performs two-dimensional scanning by controlling the first beam L1 and the second beam L2 emitted from the first light source 311 and the second light source 321, respectively. A control device (not shown) supplies control signals to the two actuators to control rotation angles around two axes of the galvanometer mirrors 34*x* and 34*y*. Accordingly, the first beam L1 and the second beam L2 having the same optical axis can be emitted to a desired position by altering the control signals being input to the two actuators.

The first beam L1 and the second beam L2 which passed through the galvanometer mirrors 34*x* and 34*y* further pass through the protection window 11 provided at the upper portion of the chamber 1. Accordingly, the material layer 63 formed in the molding region RM is irradiated with the first beam L1 and the second beam L2.

Figure 10:
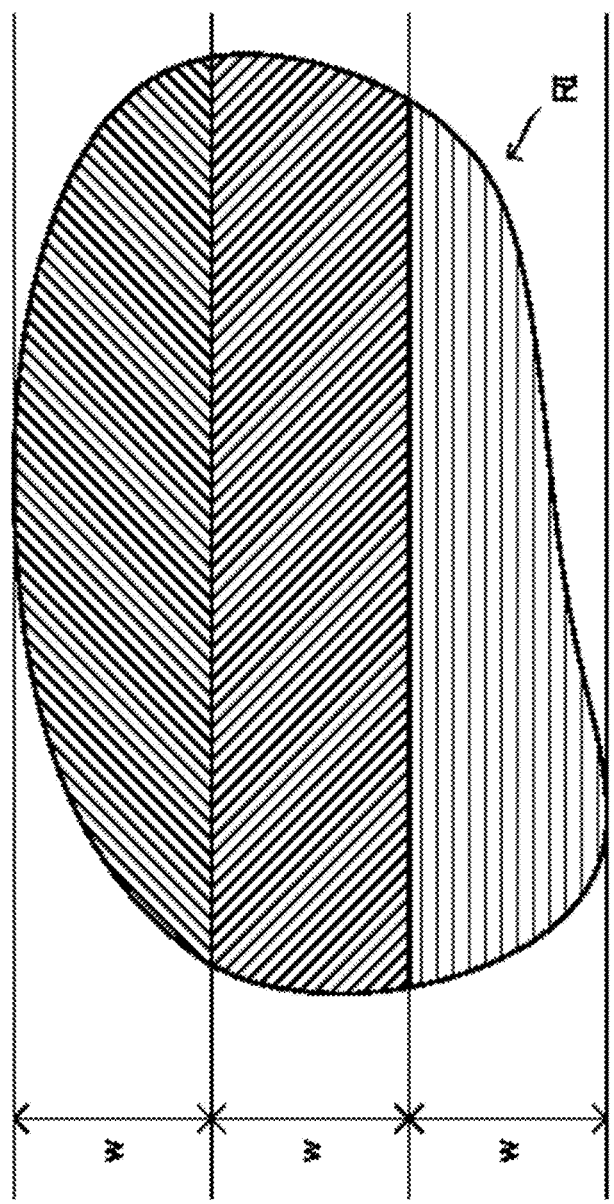
FIG. 10 is an explanatory drawing showing an irradiation region in the lamination molding apparatus according to the second embodiment.
Figure 11:
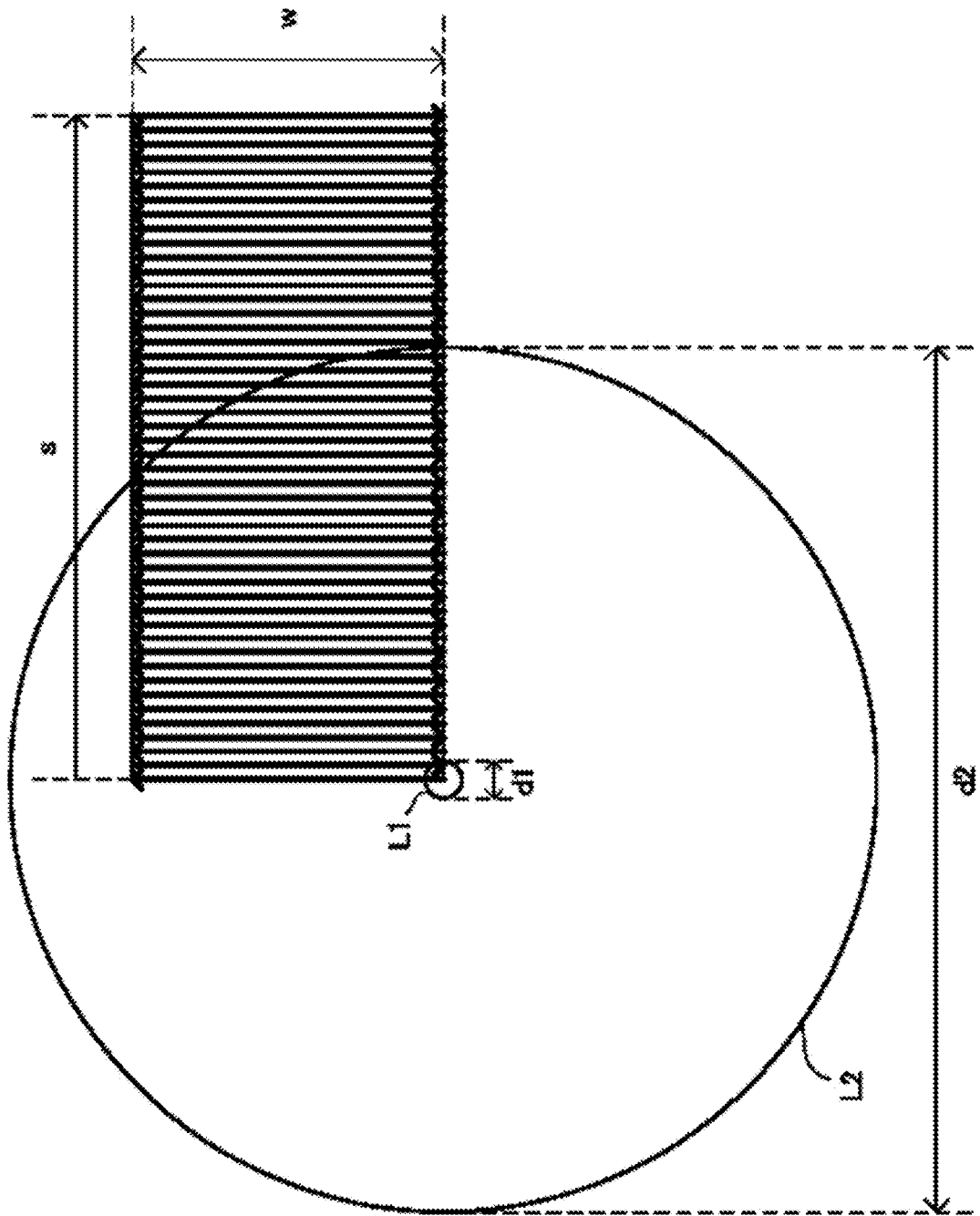
FIG. 11 is an explanatory drawing showing a scanning method of a first beam and a second beam of the lamination molding apparatus according to the second embodiment.

Here, the method for scanning the first beam L1 and the second beam L2 according to the second embodiment will be described. In this embodiment, as shown in FIG. 10, the irradiation region RI of each of the divisional layer is divided to one or more divisional regions by a predetermined width w. Scanning of the first beam L1 and the second beam L2 are carried out for each of the divisional region. Specifically, as shown by the arrow in FIG. 11, in the divisional region, scanning of the first beam L1 and the second beam L2 in a predetermined width w is performed in order along a scanning direction s which crosses orthogonally with the predetermined width w. The irradiation spot of the second beam L2 is larger than the irradiation spot of the first beam L1, and the center of each of the irradiation spots are approximately the same. Accordingly, each of the positions in the irradiation region RI is irradiated longer by the second beam L2 than the first beam L1. Here, the aforementioned method to scan the first beam L1 and the second beam L2 are merely an example, and various scanning method can be adopted. Specifically, an example of a so-called raster scanning was shown above, however, it can be a vector scanning, or a combination of the raster scanning and the vector scanning. In addition, the divisional region can also be set by any other method.

In the lamination molding apparatus according to the second embodiment, the temperature of the upper surface layer is adjusted to the first temperature T1 by using at least the second emitter 32, and then the temperature of the upper surface layer is adjusted to the second temperature T2. In the second embodiment, the following formulas of (1) to (3) are also all satisfied.

$$T1 \geq Mf \quad (1)$$

$$T1 > T2 \quad (2)$$

$$T2 \leq Ms \quad (3)$$

The upper surface layer after sintering or melting and before thermal adjustment to the second temperature T2 is in a condition containing the austenite phase, and at least a portion of the austenite phase is transformed into the martensite phase by the thermal adjustment to the second temperature T2. Here, in the second embodiment, specifically, the upper surface layer is the uppermost solidified layer 65 at the point where the initial thermal adjustment step is carried out.

As described, by structuring the second emitter 32 as the third thermal adjuster, the temperature of the upper surface layer can be adjusted to the first temperature T1. In addition, the temperature of the upper surface layer in which the temperature adjusted to the first temperature T1, is adjusted to the second temperature T2 by heat radiation to below layers of the solidified layer 65 and the molding plate 61, and to the inert gas atmosphere. Especially, as in the second embodiment, when the fourth thermal adjuster is provided, for example, when the temperature of the molding table 25 is adjusted to a temperature approximately the same as the second temperature T2, thermal adjustment of the temperature of the upper surface layer to the second temperature T2 can be performed more efficiently.

In addition, the lamination molding apparatus can have a temperature sensor 55 to measure the temperature of the uppermost material layer 63 or the upper surface layer, and the thermal adjuster can be feedback-controlled in accordance with a temperature measured by the temperature sensor 55. For example, the scanning speed, laser strength, and the size of the diameter of the irradiation spot of the second beam L2, can be feedback-controlled. With such configuration, temperature of the uppermost material layer 63 or the upper surface layer can be controlled with higher accuracy. One or a plurality of temperature sensors 55 can be provided. In addition, the temperature sensor 55 is, for example, an infrared temperature sensor.

Here, each of the steps of the manufacturing method of the lamination molded product according to the second embodiment will be described. The definitions for the material layer forming step, the preheating step, the solidifying step, the initial thermal adjustment step, the next thermal adjustment step, and the cutting step are as described above. Especially, in the second embodiment, the preheating step and the initial thermal adjustment step are performed by the second beam L2.

First, the material layer forming step is carried out. A material layer 63 is formed on the molding plate 61 placed on an appropriate position of the molding table 25, or on the solidified layer 65, using the recoater head 23.

Subsequently, the preheating step, the solidifying step, the initial thermal adjustment step, and the next thermal adjustment step are carried out. The preheating step, the solidifying step, the initial thermal adjustment step, and the next thermal adjustment step are carried out in parallel, however, when focused on a particular position, the processes are carried out in the order of the preheating step, the solidifying step, the initial thermal adjustment step, and the next thermal adjustment step. Here, a particular position P in FIG. 12A through FIG. 12E is focused. In FIGS. 12A through 12E, scanning of the first beam L1 and the second beam L2 in the direction of the predetermined width w are roughly shown, where the scanning passage includes the predetermined position P.

Figure 12A:
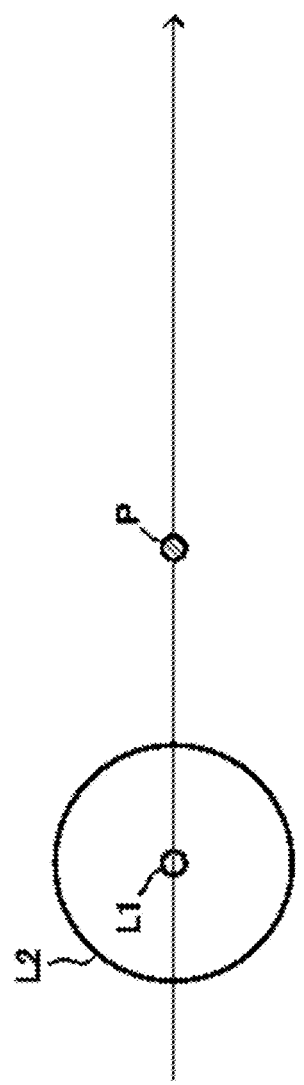
FIG. 12A is an explanatory drawing showing a predetermined portion before a preheating step in the lamination molding apparatus according to the second embodiment.
Figure 12B:
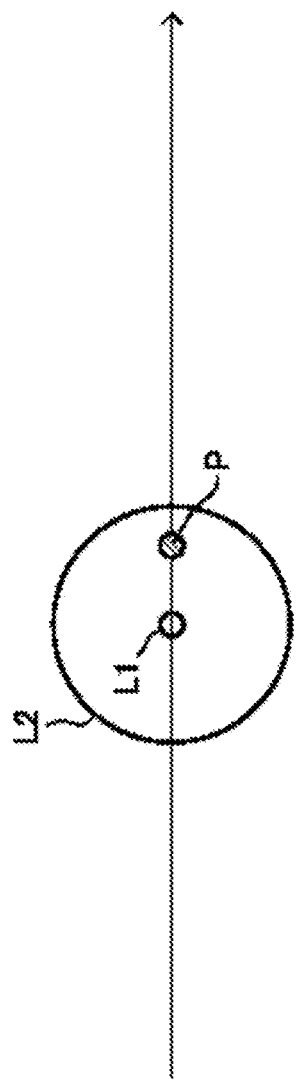
FIG. 12B is an explanatory drawing showing the predetermined portion during the preheating step in the lamination molding apparatus according to the second embodiment.

In the condition shown by FIG. 12A, the predetermined position P is not irradiated with the first beam L1 and the second beam L2. Here, the first preheating is carried out at the predetermined position P. As shown in FIG. 12B, the first beam L1 and the second beam L2 are scanned, and thus the predetermined position P is irradiated with the second beam L2. Accordingly, the predetermined position P is preheated to a temperature suitable for being solidified. Here, it is preferable that the material layer 63 at the vicinity of the starting point of the scanning in each of the divisional region is irradiated with the second beam L2 for a predetermined time before the first beam L1 and the second beam L2 are scanned in the divisional region, until the vicinity of the starting point is heated to the temperature suitable for being solidified.

Figure 12C:
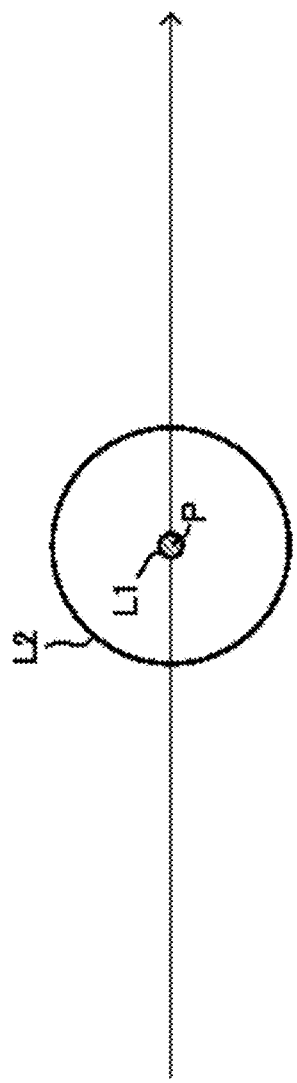
FIG. 12C is an explanatory drawing showing the predetermined portion during a solidifying step in the lamination molding apparatus according to the second embodiment.

Subsequently, the solidifying step is carried out at the predetermined position P. That is, as shown in FIG. 12C, the predetermined position P in the material layer 63 is irradiated with the first beam L1 and the material layer at the position of laser irradiation is sintered or melted. That is, the predetermined position P becomes a part of the solidified layer 65.

Figure 12D:
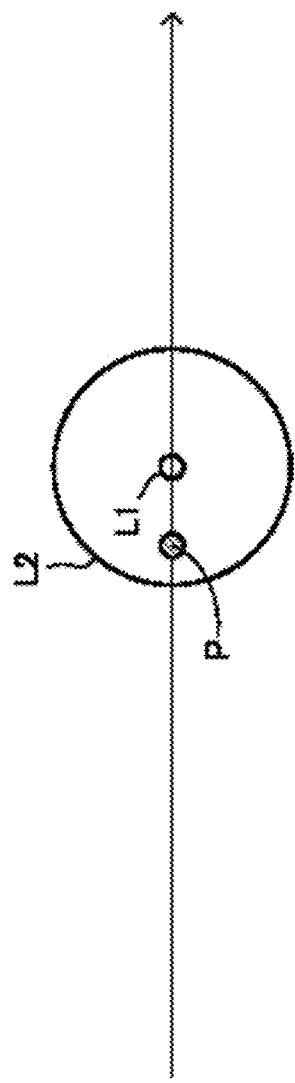
FIG. 12D is an explanatory drawing showing the predetermined portion during an initial thermal adjustment step in the lamination molding apparatus according to the second embodiment.

Subsequently, the initial thermal adjustment step is carried out at the predetermined position P. As shown in FIG. 12D, the predetermined position P which became a part of the solidified layer 65 is irradiated with the second beam L2. The temperature of the predetermined position P reaches at least the first temperature T1 by irradiation with the second beam L2. Here, in order to allow martensitic transformation to occur when the temperature of the solidified layer 65 at the vicinity of the end point of the scanning in each of the divisional region is adjusted to the second temperature T2, it is preferable that the solidified layer 65 at the vicinity of the end point of the scanning is irradiated with the second beam L2 for a predetermined time after the scanning with the first beam L1 and the second beam L2 are completed and until sufficient irradiation with the second beam L2 is performed. In addition, the time during which the temperature is maintained at the first temperature T1 in the initial thermal adjustment step and a value of the first temperature T1 is set to a suitable value depending on the metal material being used or the metal material expected to be used. For example, the time and the value of the first temperature T1 in the initial thermal adjustment step can be adjusted by the scanning speed, laser strength, and the diameter of the irradiation spot of the second beam L2.

As shown in FIG. 12E, after the irradiation of the predetermined position P with the second beam L2 is completed, the next thermal adjustment step is carried out at the predetermined position P. The temperature of the predetermined position P reaches the second temperature T2 by heat radiation to below layers of the solidified layer and the molding plate 61, and to the inert gas atmosphere.

The material layer forming step, the preheating step, the solidifying step, the initial thermal adjustment step, and the next thermal adjustment step, and preferably the cutting step suitably inserted are repeated to form the desired three-dimensional molded product. Here, in the afore-mentioned manufacturing method, the material layer forming step, the preheating step, the solidifying step, the initial thermal adjustment step, and the next thermal adjustment step were carried out in parallel, however, the material layer forming step, the preheating step, the solidifying step, the initial thermal adjustment step, and the next thermal adjustment step need not be carried out in parallel so long as the material layer forming step, the preheating step, the solidifying step, the initial thermal adjustment step, and the next thermal adjustment step are carried out in this order at each position. For example, after each time the solidifying step to form one or a plurality of the solidified layers 65 is completed, the initial thermal adjustment step and the next thermal adjustment step can be carried out. In such case, the upper surface layer is the one or a plurality of layers of the solidified layer 65 including at least the uppermost solidified layer at the point of the initial thermal adjustment step.

As specifically shown for the first embodiment and the second embodiment, by repeating the thermal adjustment including the initial thermal adjustment step and the next thermal adjustment step during lamination molding, the tensile stress due to shrinkage during cooling of the solidified layer 65 can be suppressed by the volume expansion during martensitic transformation, thereby suppressing deformation of the molded product. In other words, the initial thermal adjustment step and the next thermal adjustment step are performed for a plurality of times during molding to suppress tensile stress while performing lamination of the solidified layers 65.

The temperature in which the martensitic transformation occur is ranges from martensite finish temperature Mf to martensite start temperature Ms, inclusive. That is, the amount of expansion by the martensitic transformation, and eventually the residual stress of the molded product can be controlled by the relationship among the first temperature T1, the second temperature T2, the martensite start temperature Ms, and the martensite finish temperature Mf. Here, as a typical example of the method for controlling the residual stress, the thermal adjustment patterns as shown in FIG. 13 through FIG. 18 can be mentioned. In FIG. 13 through FIG. 18, the temperature change in the first embodiment is shown. That is, the temperature change in the solidified layer 65 of the predetermined divisional layer, when the solidified layer 65 after solidification undergoes a thermal adjustment in the order of the first temperature T1, the second temperature T2, and the first temperature T1, is roughly shown. Specific explanation of the temperature change at each point of time in the first embodiment is provided herein. First, the material layer 63 is irradiated with the first beam L1, thereby forming the solidified layer 65. Immediately after forming, the heat of the solidified layer 65 is radiated to the lower layer of the solidified layer 65, the molding plate 61 and the like, thereby maintaining the temperature of the solidified layer 65 at the first temperature T1 (t1). When the predetermined layers of the solidified layer 65 are formed (t2), the temperature of the solidified layer 65 is adjusted to the second temperature T2 (t3). After the thermal adjustment to the second temperature T2 is completed (t4), the temperature of the solidified layer 65 is raised again to the first temperature T1 (t5). Here, as described, it is necessary that the temperature of the predetermined position of the solidified layer 65 is adjusted at least in the order of the first temperature T1 and the second temperature T2. Therefore, the present disclosure shall not be regarded as a limitation to the temperature change shown in FIG. 13 through FIG. 18. FIG. 13 through FIG. 18 are merely a reference drawing to visually show the relation among each formula. In addition, the same pattern can be applied for all of the solidified layers 65 of the divisional layers. However, a different pattern can be applied individually for the solidified layers 65 of each of the divisional layers.

<Pattern A>

Figure 13:
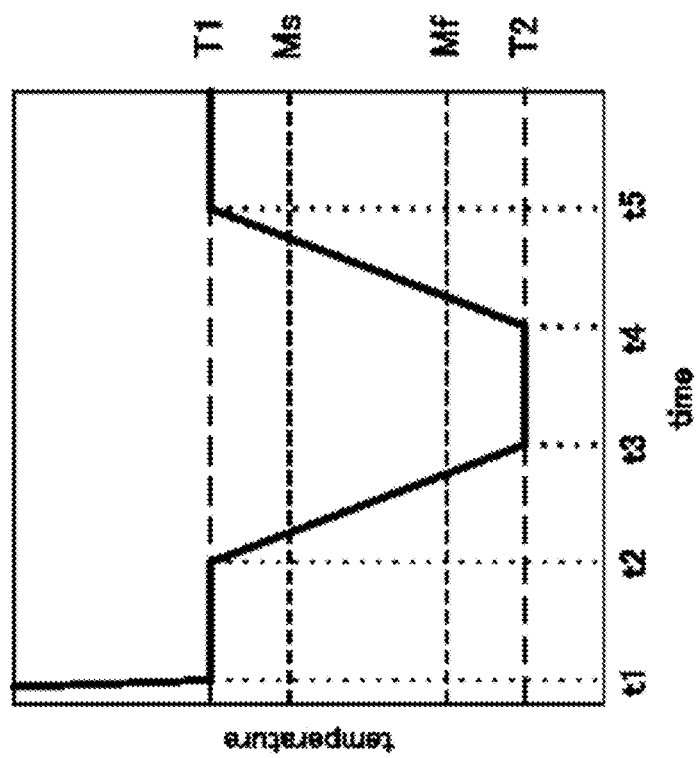
FIG. 13 is a schematic diagram of the temperature change when thermal adjustment of pattern A is carried out.

In Pattern A, both of the first temperature T1 and the second temperature T2 are not included in the temperature range in which the martensitic transformation occurs. That is, the following formulas (1), (2), (3), (4), and (5) are all satisfied. A schematic diagram of the temperature change of the predetermined solidified layer 65 with Pattern A is shown in FIG. 13.

$$T1 \geq Mf \quad (1)$$

$$T1 > T2 \quad (2)$$

$$T2 \leq Ms \quad (3)$$

$$T1 > Ms \tag{4}$$

$$T2 < Mf \tag{5}$$

In Pattern A, the temperature control becomes easy since there is no restriction regarding the upper limit of the first temperature T1 and the lower limit of the second temperature T2 within the temperature range capable of performing thermal adjustment by the thermal adjuster. In addition, since the next thermal adjustment step is started when the temperature of the upper surface layer is greater than or equal to the martensite start temperature Ms and the next thermal adjustment step is performed until the temperature of the upper surface layer becomes equal to or less than martensite finish temperature Mf, that is, since martensitic transformation takes place in all of the temperature range capable of undergoing the martensitic transformation, reproducibility is high. This controlling method is suitable for materials having an expansion amount due to the martensitic transformation which is equal to or smaller than the shrinkage amount generated during molding.

<Pattern B>

Figure 14:
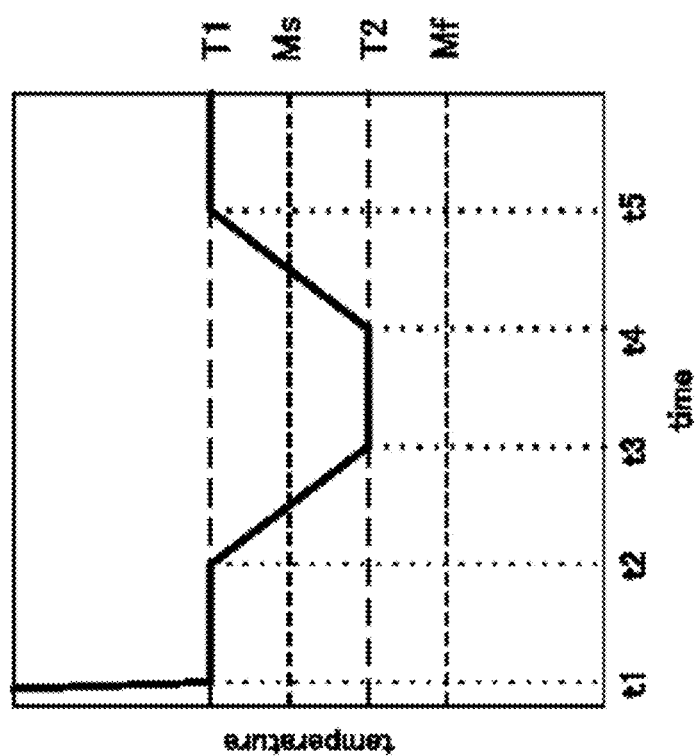
FIG. 14 is a schematic diagram of the temperature change when thermal adjustment of pattern B is carried out.

In Pattern B, only the second temperature T2 is included within the temperature range capable of undergoing the martensitic transformation. That is, the following formulas (1), (2), (3), (4), and (6) are all satisfied. A schematic diagram of the temperature change of the predetermined solidified layer 65 with Pattern B is shown in FIG. 14.

$$T1 \geq Mf \tag{1}$$

$$T1 > T2 \tag{2}$$

$$T2 \leq Ms \tag{3}$$

$$T1 > Ms \tag{4}$$

$$T2 \geq Mf \tag{6}$$

In Pattern B, there is no need to take into consideration the influence of the temperature increase of the solidified layer 65 due to irradiation with the first beam L1, and molding can be proceeded in a condition where the residual stress is suppressed. When the temperature is lowered after completion of molding, compressive stress can be generated. By allowing an appropriate degree of compressive stress to remain in the molded product, generation of cracks can be suppressed. This controlling method is suitable for materials having an expansion amount due to the martensitic transformation which is fairly larger than the shrinkage amount generated during molding.

<Pattern C>

Figure 15:
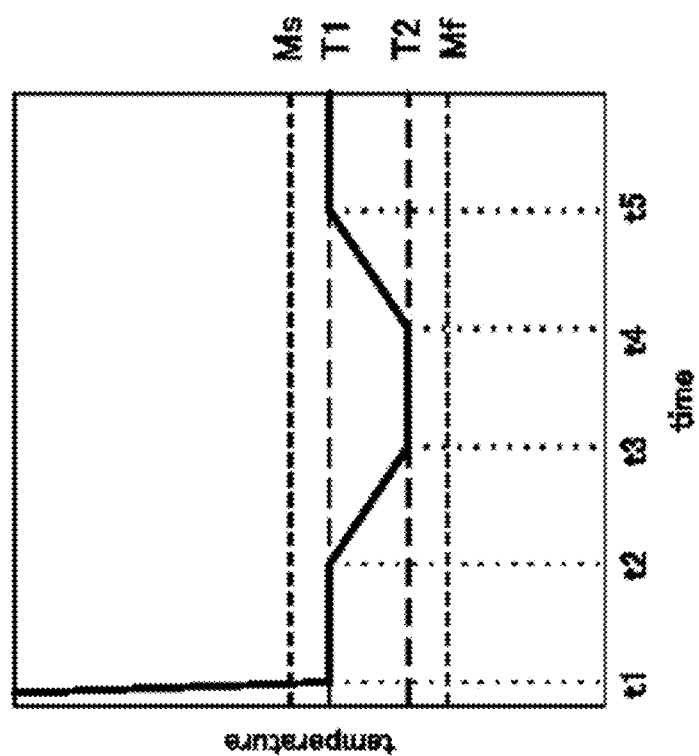
FIG. 15 is a schematic diagram of the temperature change when thermal adjustment of pattern C is carried out.

In Pattern C, both of the first temperature T1 and the second temperature T2 are included within the temperature range capable of undergoing the martensitic transformation. That is, the following formulas (1), (2), (3), (6), and (7) are all satisfied. A schematic diagram of the temperature change of the predetermined solidified layer 65 with Pattern C is shown in FIG. 15.

$$T1 \geq Mf \tag{1}$$

$$T1 > T2 \tag{2}$$

$$T2 \leq Ms \tag{3}$$

$$T1 \leq Ms \tag{7}$$

$$T2 \geq Mf \tag{6}$$

In Pattern C, when the temperature can be controlled accurately, the residual stress can be controlled during molding, and after finishing molding and cooling. This controlling method is suitable for materials having an expansion amount due to the martensitic transformation which is fairly larger than the shrinkage amount generated during molding.

<Pattern D>

Figure 16:
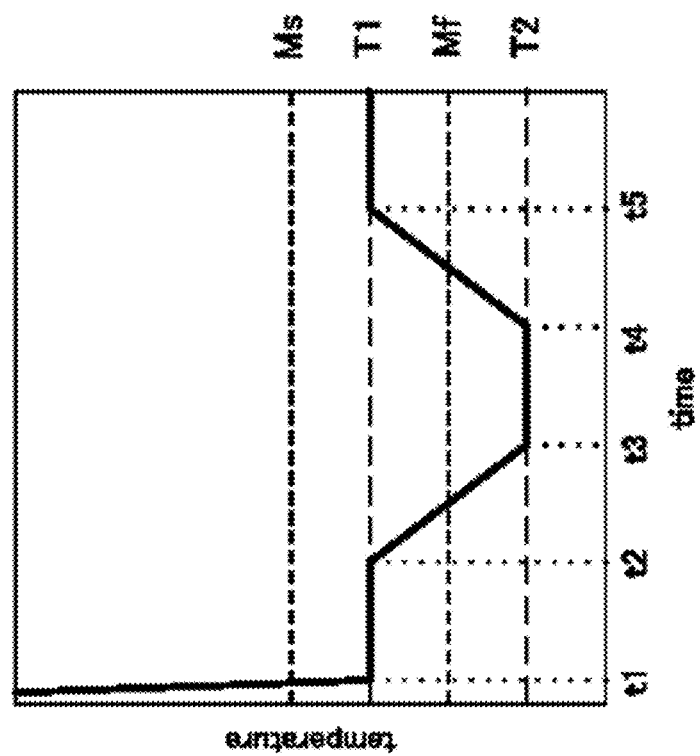
FIG. 16 is a schematic diagram of the temperature change when thermal adjustment of pattern D is carried out.

In Pattern D, only the first temperature T1 is included within the temperature range capable of undergoing the martensitic transformation. That is, the following formulas (1), (2), (3), (5), and (7) are all satisfied. A schematic diagram of the temperature change of the predetermined solidified layer 65 with Pattern D is shown in FIG. 16.

$$T1 \geq Mf \tag{1}$$

$$T1 > T2 \tag{2}$$

$$T2 \leq Ms \tag{3}$$

$$T1 \leq Ms \tag{7}$$

$$T2 < Mf \tag{5}$$

In Pattern D, although there is an influence of the temperature increase of the solidified layer 65 due to irradiation with the first beam L1, the residual stress during molding and the residual stress after completion of the molding are approximately the same, and thus control can be done easily. Especially, when the cutting step is performed with the solidified layer 65 having its temperature adjusted to the second temperature T2, the molded product can be finished with higher accuracy, which is preferable. This controlling method is suitable for materials having an expansion amount due to the martensitic transformation which is fairly larger than the shrinkage amount generated during molding.

In Pattern A and Pattern B, when the martensite start temperature Ms is relatively high, the first temperature T1 is required to have a higher temperature. In the lamination molding apparatus according to the second embodiment, the second beam L2 is used to heat the upper surface layer, thereby allowing to realize high first temperature T1. Accordingly, the lamination molding apparatus according to the second embodiment is suitable to employ pattern A and pattern B.

In pattern B or pattern C, when the second temperature T2 is not the same as the martensite finish temperature Mf, the martensitic transformation would further progress after the molding is completed and the temperature of the three-dimensional molded product becomes lower than the second temperature T2. This would result in the possibility of generation of undesired expansion. Accordingly, in Pattern B and Pattern C, it is preferable to set the second temperature T2 at or below the lowest temperature Tm at which the three-dimensional molded product would be subjected after being molded. That is, the following Pattern B2 and Pattern C2 are more preferable.

<Pattern B2>

Figure 17:
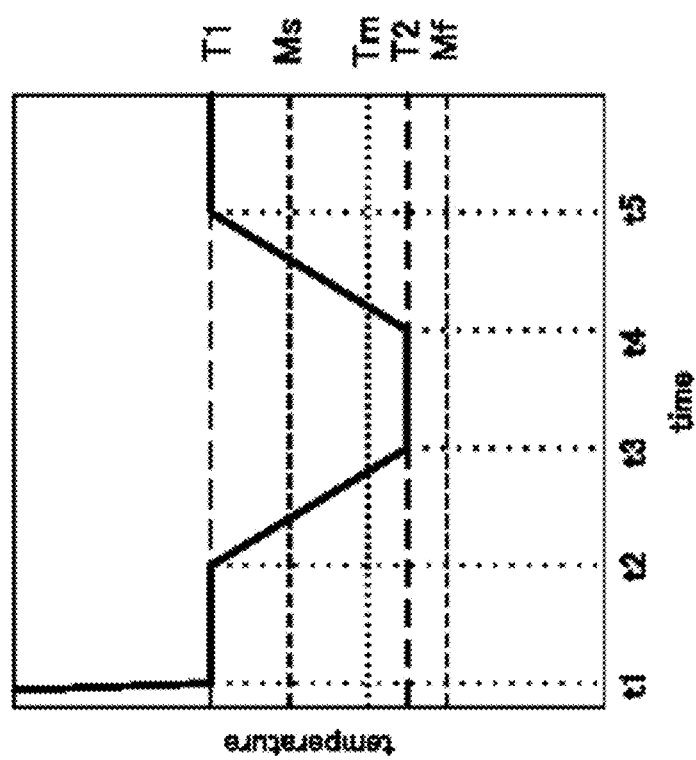
FIG. 17 is a schematic diagram of the temperature change when thermal adjustment of pattern B2 is carried out.

In Pattern B2, the following formulas (1), (2), (3), (4), (6), (8), and (9) are all satisfied. Here, a schematic diagram of the temperature change of the predetermined solidified layer 65 with Pattern B2 is shown in FIG. 17.

$$T1 \geq Mf \tag{1}$$

$$T1 > T2 \tag{2}$$

$$T2 \leq Ms \tag{3}$$

| | |
|---|---|
| T1>Ms | (4) |
| T2≥Mf | (6) |
| T2≠Mf | (8) |
| T2≤Tm | (9) |

<Pattern C2>

Figure 18:
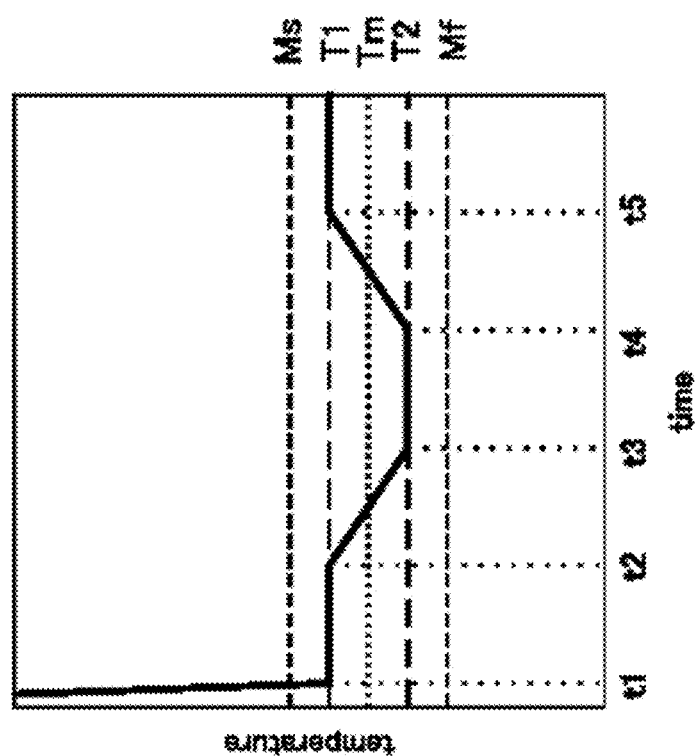
FIG. 18 is a schematic diagram of the temperature change when thermal adjustment of pattern C2 is carried out.

In Pattern C2, the following formulas (1), (2), (3), (6), (7), (8), and (9) are all satisfied. Here, a schematic diagram of the temperature change of the predetermined solidified layer 65 with Pattern C2 is shown in FIG. 18.

| | |
|---|---|
| T1≥Mf | (1) |
| T1>T2 | (2) |
| T2≤Ms | (3) |
| T1≤Ms | (7) |
| T2≥Mf | (6) |
| T2≠Mf | (8) |
| T2≤Tm | (9) |

Each of the temperature patterns as described above have limited application regarding the materials. For example, when the temperature adjustment of the afore-mentioned Pattern A is carried out, at least the martensite start temperature Ms and the martensite finish temperature Mf need be included in the temperature range which can be controlled by the thermal adjuster, however, not all of the materials satisfy such conditions. On the other hand, it is known that the martensite start temperature Ms and the martensite finish temperature Mf can vary depending on the carbon content of the material. Accordingly, by adjusting the carbon content of the material, the molding method according to the present invention utilizing the martensitic transformation can be applied to various materials.

As a method for adjusting the carbon content of the material, for example, a plurality of materials can be mixed. Specifically, to a first metal as the predetermined metal, at least one of a second metal as another metal having relatively high carbon content and carbon can be mixed. Accordingly, a material mixture having a desired martensite start temperature Ms or a martensite finish temperature Mf can be prepared.

The lamination molding apparatuses according to the first embodiment and the second embodiment of the present invention perform the lamination molding by SLS or SLM. However, the lamination molding apparatus can perform the lamination molding by LOM. In the LOM, the material layer former forms the material layer by using a metal sheet in the form of a plate, the metal sheet being used for each of the plurality of divisional layers of a desired three-dimensional molded product divided by a predetermined height. That is, instead of the material powder, a metal sheet in the form of a plate can be used to form the material layer, and the predetermined portion of the material layer can be irradiated with the first beam L1 to melt the metal sheet. These processes can be repeated.

In the first embodiment and the second embodiment, a laser beam was used as the first beam L1, however, other constitution can be adopted so long as it can form the solidified layer 65. For example, the first beam L1 can be an electron beam. In addition, in the second embodiment, a laser beam was used as the second beam L2, however, other constitution can be adopted so long as it can adjust the temperature of the solidified layer 65 to the first temperature T1. For example, the second beam L2 can be an electron beam.

So long as the following formulas (1) through (3) are all satisfied,

| | |
|---|---|
| T1≥Mf | (1) |
| T1>T2 | (2) |
| T2≤Ms | (3) | the first temperature T1 and the second temperature T2 need not be constant during molding. For example, the specific values of the first temperature T1 and the second temperature T2 can vary for each of the initial thermal adjustment step or the next thermal adjustment step.

Although embodiments of the present invention and modifications thereof have been described, they have been presented as examples and are not intended to limit the scope of the invention. These novel embodiments can be implemented in various other forms, and various omissions, substitutions, and changes can be made without departing from the spirit of the invention. Especially, each of the technical features shown in the first embodiment and the second embodiment can be combined with each other so long as such combination does not give rise to a technical contradiction. These embodiments and modifications thereof are included in the scope and gist of the invention and are included in the invention described in the claims and the equivalent scope thereof.

Hereinafter, the present invention shall be explained with reference to the Examples, however, the present invention shall not be limited to these Examples.

A material powder made of SUS 420 J2 having an average particle diameter of 20 μm was used as the material, and lamination molding of a predetermined molded product was carried out on a molding plate 61 under various temperature conditions. SUS 420 J2 is a martensitic stainless steel stipulated in the Japanese Industrial Standards, the carbon content before the molding being lower than 0.44 wt %, martensite start temperature Ms being approximately 100° C., and the martensite finish temperature Mf being approximately 0° C. The size of the molding plate 61 was 125× 125×15 mm (length×width×thickness). The size of the molded product was 80×80×35 mm (length×width×thickness).

Figure 19:
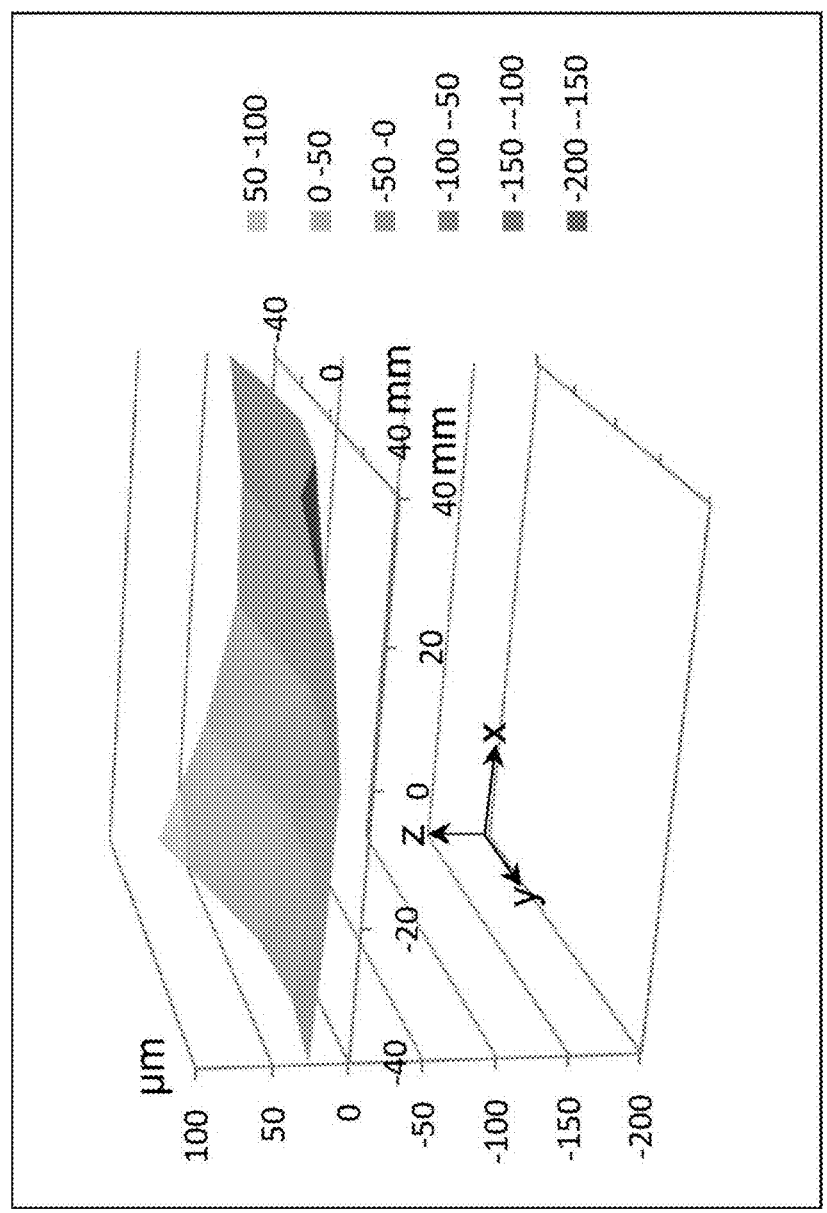
FIG. 19 is a three-dimensional diagram of results obtained by measuring strain of the molded product according to an Example.
Figure 20:
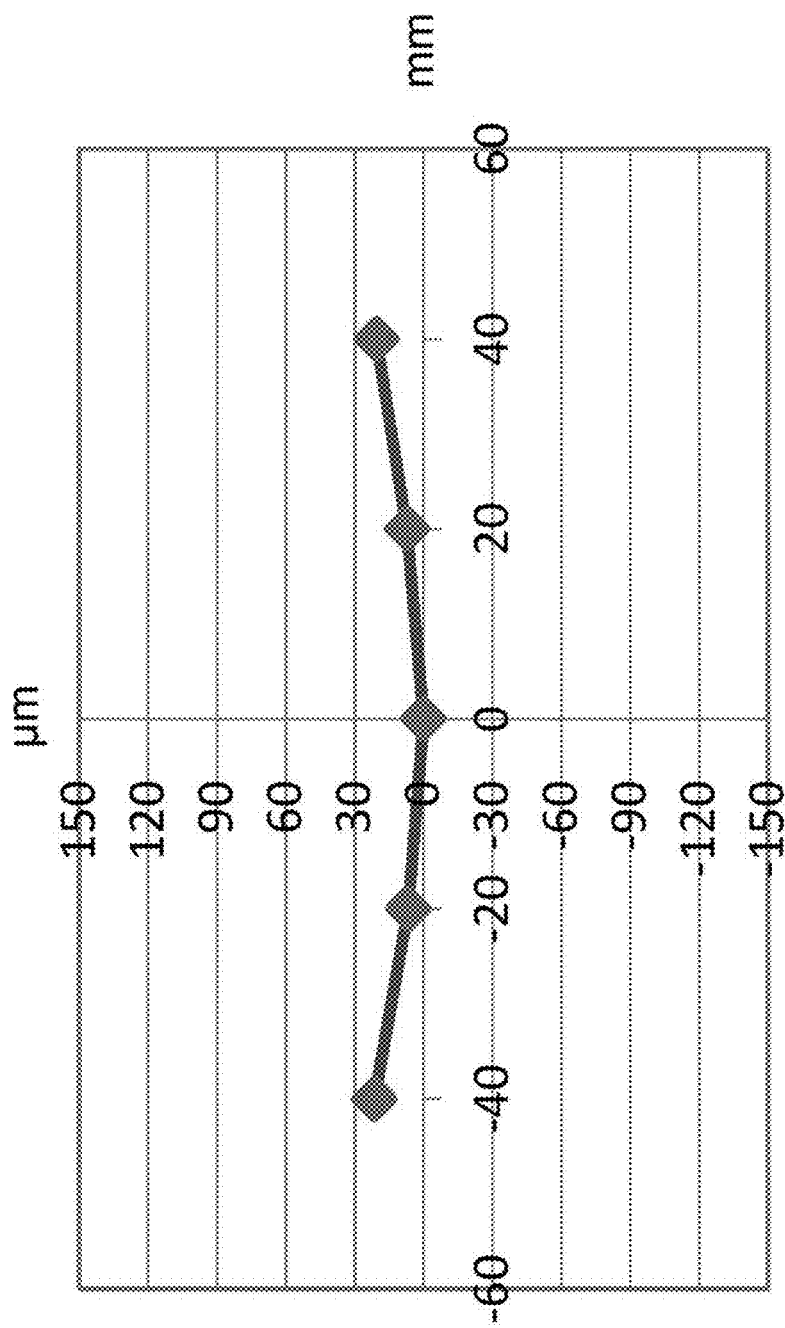
FIG. 20 is a diagram showing strain in the x-z plane (y=0) of the molded product of FIG. 19 according to an Example.

First, the temperature of the molding table 25 was adjusted to 70° C. using the first thermal adjuster 51. Subsequently, the material layer forming step to spread the material powder uniformly on the molding table 25 by the recoater head 11 to form the material layer 63, and the solidifying step to sinter the material powder by irradiating a predetermined portion of the material layer 63 with a laser beam as the first beam L1 for 4 minutes were repeated, thereby forming an upper surface layer having a thickness of 5 mm formed by a plurality of solidified layers 65. Then, the temperature of the molding table 25 maintained at 70° C. was lowered to 29° C. After the temperature of the upper layer was lowered to 29° C., the temperature of the molding table 25 was raised to 70° C. That is, the thermal adjustment step corresponding to the afore-mentioned Pattern D was carried out using the molding apparatus according to the first embodiment. Thereafter, similar processes were repeated 6 times to obtain a predetermined molded product. With the molded product thus obtained, the condition of the warp at the back face of the molding plate 61, that is, the face at the opposite side of the face onto which the molded product was formed, was measured to observe the condition of the residual stress. As a result, as shown in FIG. 19 and FIG. 20, the residual stress was suppressed.

Figure 21:
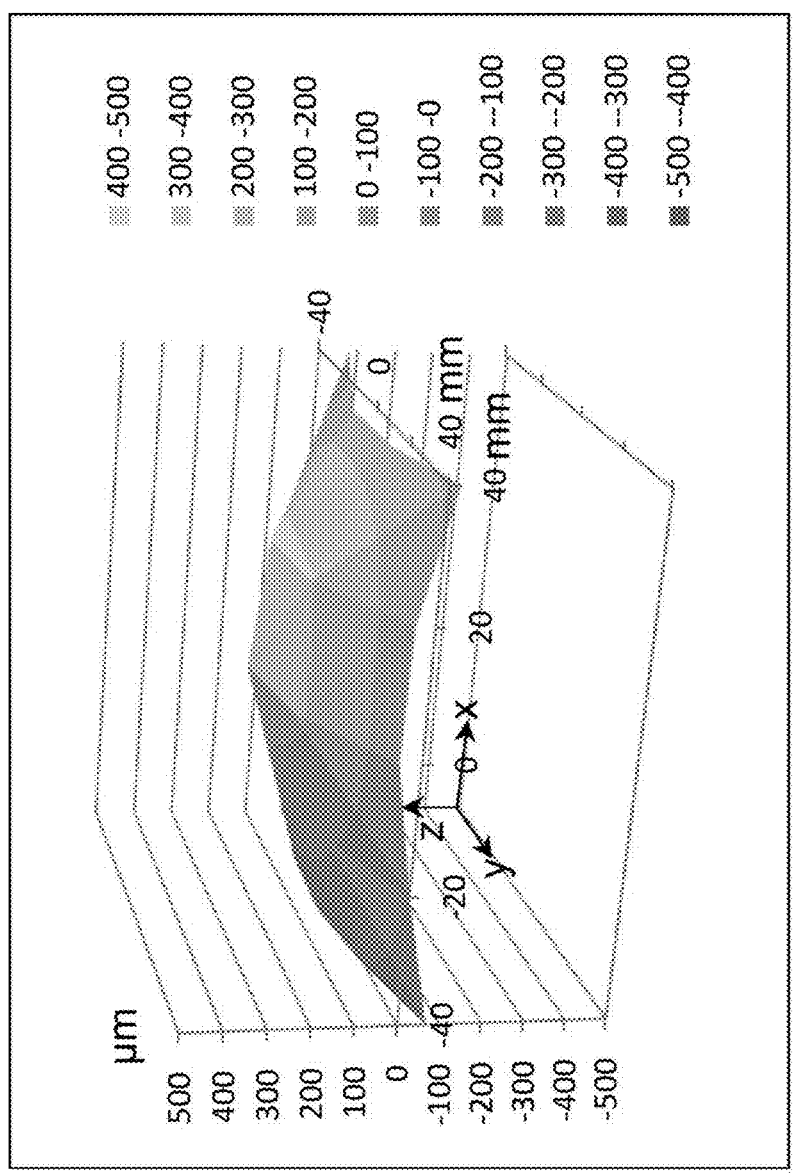
FIG. 21 is a three-dimensional diagram of results obtained by measuring strain of the molded product according to a Comparative Example.
Figure 22:
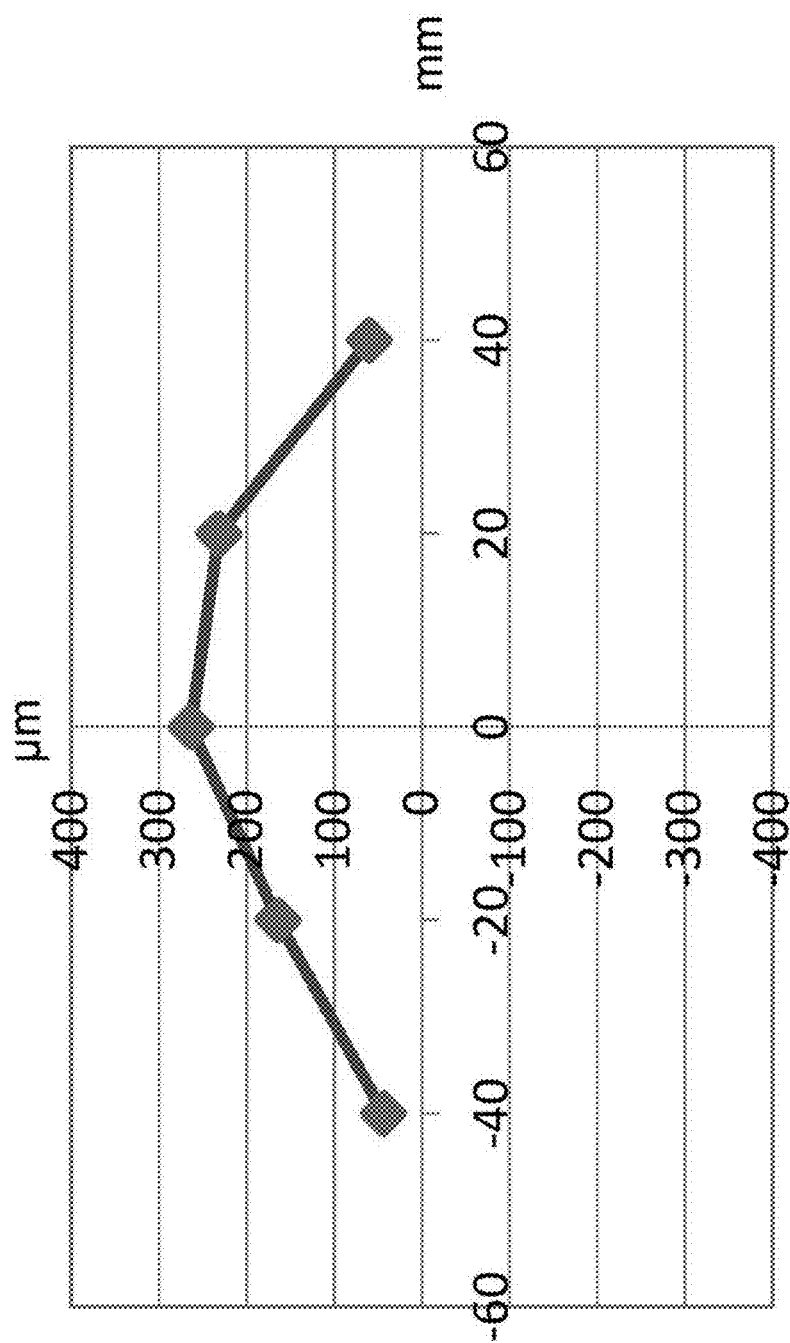
FIG. 22 is a diagram showing strain in the x-z plane (y=0) of the molded product of FIG. 21 according to a Comparative Example.

The temperature of the molding table 25 was maintained roughly constant at 24° C., and the material layer forming step and the solidifying step were repeated to obtain the predetermined molded product. By observing the conditions of the molded product in a similar manner as the Example, it became apparent that the strain was large and the tensile stress was large as shown in FIG. 21 and FIG. 22. Here, cracks occurred with the molded product and in the boundary of the molded product and the molding plate 61.

The invention claimed is:

1. A method for manufacturing a lamination molded product, comprising the steps of:
   a material layer forming step to form a material layer in a molding region, the material layer being formed for a plurality of divisional layers which are a desired three-dimensional molded product divided by a predetermined height;
   a solidifying step to form a solidified layer by irradiating a predetermined irradiation region in the material layer of the divisional layer with a first beam and sintering or melting the predetermined irradiation region;
   an initial thermal adjustment step to adjust the temperature of at least a portion of the solidified layer to a predetermined first temperature; and
   a next thermal adjustment step to adjust the temperature of the at least a portion of the solidified layer having the first temperature to a predetermined second temperature; wherein
   the initial thermal adjustment step and the next thermal adjustment step is performed to the at least a portion of the solidified layer in order of the initial thermal adjustment step, the next thermal adjustment step, and then the initial thermal adjustment step while manufacturing the three-dimensional molded product; and
   when the first temperature is referred to as T1, the second temperature is referred to as T2, a martensite start temperature of the solidified layer is referred to as Ms, and a martensite finish temperature of the solidified layer is referred to as Mf, following formulas of (1) to (3) are all satisfied:

$$T1 \geq Mf \tag{1}$$

$$T1 > T2 \tag{2}$$

$$T2 \leq Ms \tag{3}$$

2. The method of claim 1, further comprising a step of:
   a preheating step to preheat the material layer before being irradiated with the first beam.

3. The method of claim 1, further comprising the step of:
   a cutting step to cut the solidified layer; wherein:
   the cutting step performs cutting to the solidified layer after the next thermal adjustment step.

4. The method of claim 3, wherein the cutting step is performed to the solidified layer after the next thermal adjustment step and a thermal adjustment to normal temperature.

5. The method of claim 1, further satisfying the following formulas of (4) and (5):

$$T1 > Ms \tag{4}$$

$$T2 < Mf \tag{5}$$

6. The method of claim 1, further satisfying the following formulas of (4) and (6):

$$T1 > Ms \tag{4}$$

$$T2 \geq Mf \tag{6}$$

7. The method of claim 6, wherein when a lowest temperature at which the three-dimensional molded product is subjected after being molded is referred to as Tm, further satisfies the following formulas of (8) and (9):

$$T2 \neq Mf \tag{8}$$

$$T2 \leq Tm \tag{9}$$

8. The method of claim 1, further satisfying the following formulas of (7) and (6):

$$T1 \leq Ms \tag{7}$$

$$T2 \geq Mf \tag{6}$$

9. The method of claim 8, wherein when a lowest temperature at which the three-dimensional molded product is subjected after being molded is referred to as Tm, further satisfies the following formulas of (8) and (9):

$$T2 \neq Mf \tag{8}$$

$$T2 \leq Tm \tag{9}$$

10. The method of claim 1, further satisfying the following formulas of (7) and (5):

$$T1 \leq Ms \tag{7}$$

$$T2 < Mf \tag{5}$$

* * * * *